June 20, 1961   R. S. MARK ET AL   2,989,231
CALCULATING MACHINE
Filed May 6, 1955   13 Sheets-Sheet 1

INVENTORS,
Richard S. Mark, Alpheus F.
Stansell, Kenneth F. Oldenburg &
Robert E. Boyden

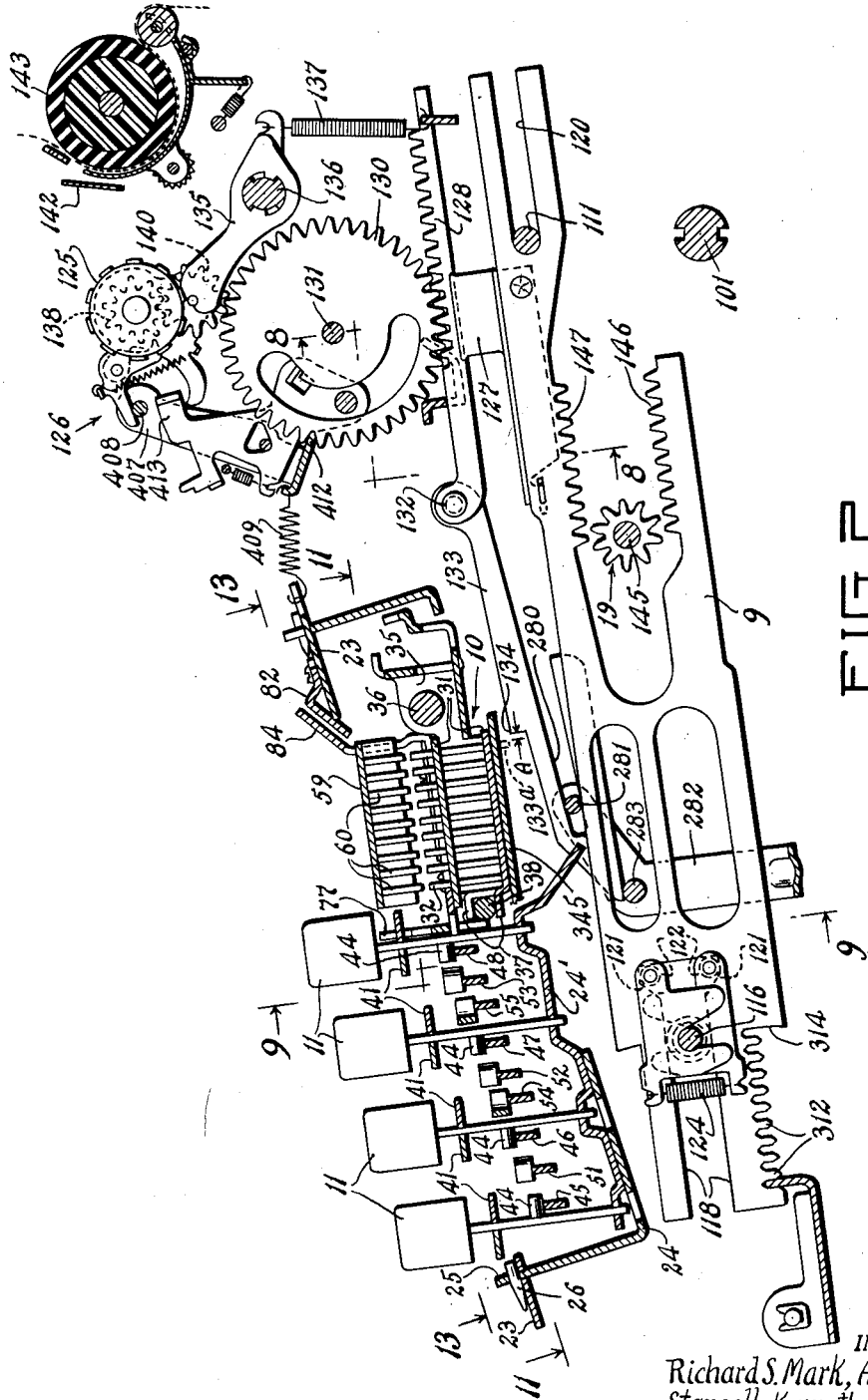
FIG. 2
INVENTORS,
Richard S. Mark, Alpheus F.
Stansell, Kenneth F. Oldenburg &
Robert E. Boyden
BY 

June 20, 1961 R. S. MARK ET AL 2,989,231
CALCULATING MACHINE
Filed May 6, 1955 13 Sheets-Sheet 5

INVENTORS,
Richard S. Mark, Alpheus F.
Stansell, Kenneth F. Oldenburg &
Robert E. Boyden
BY Fred N. Schwend INVENTORS,
Richard S. Mark, Alpheus F.
Stansell, Kenneth F. Oldenburg &
Robert E. Boyden
BY Fred N. Schwend

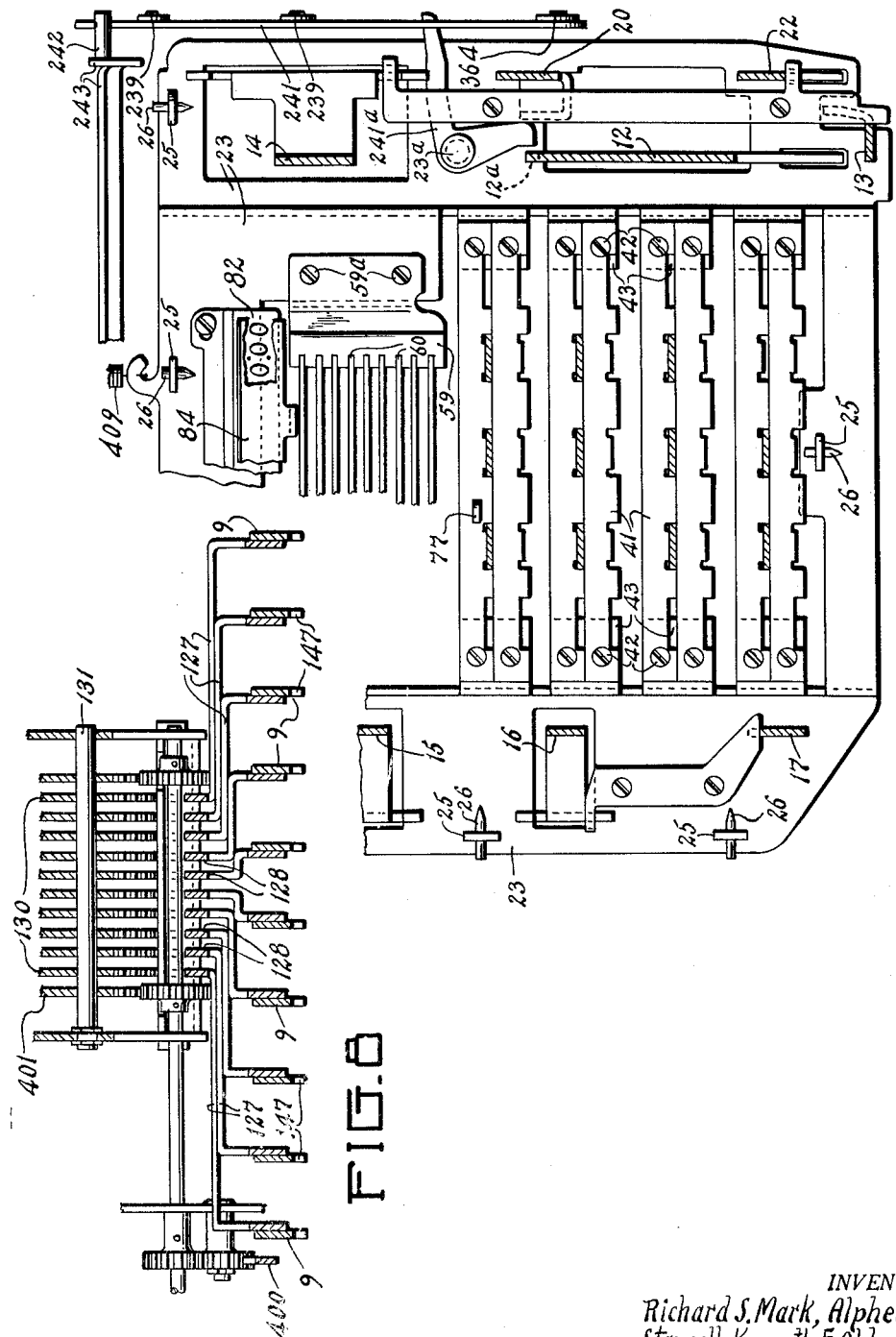

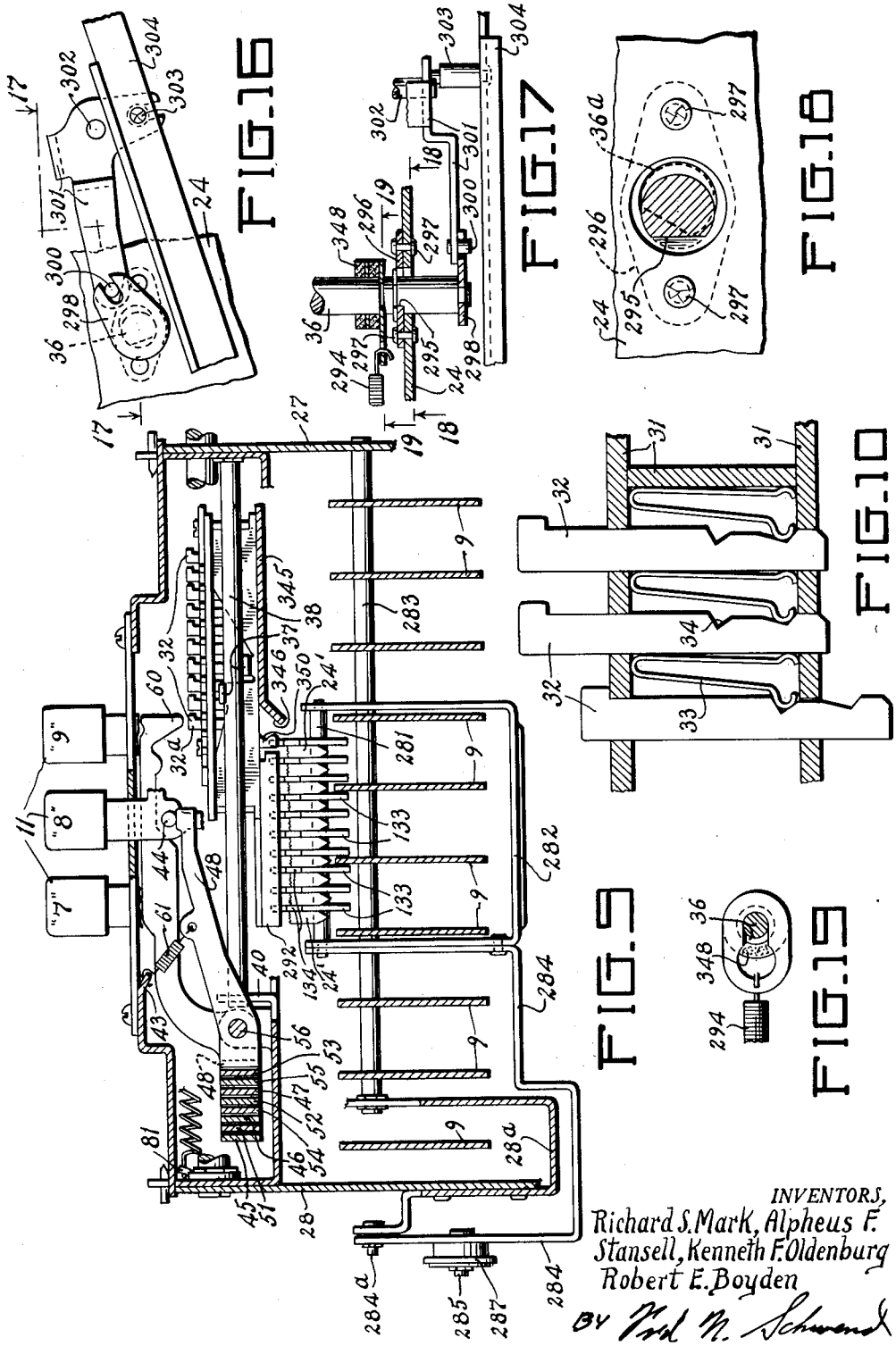

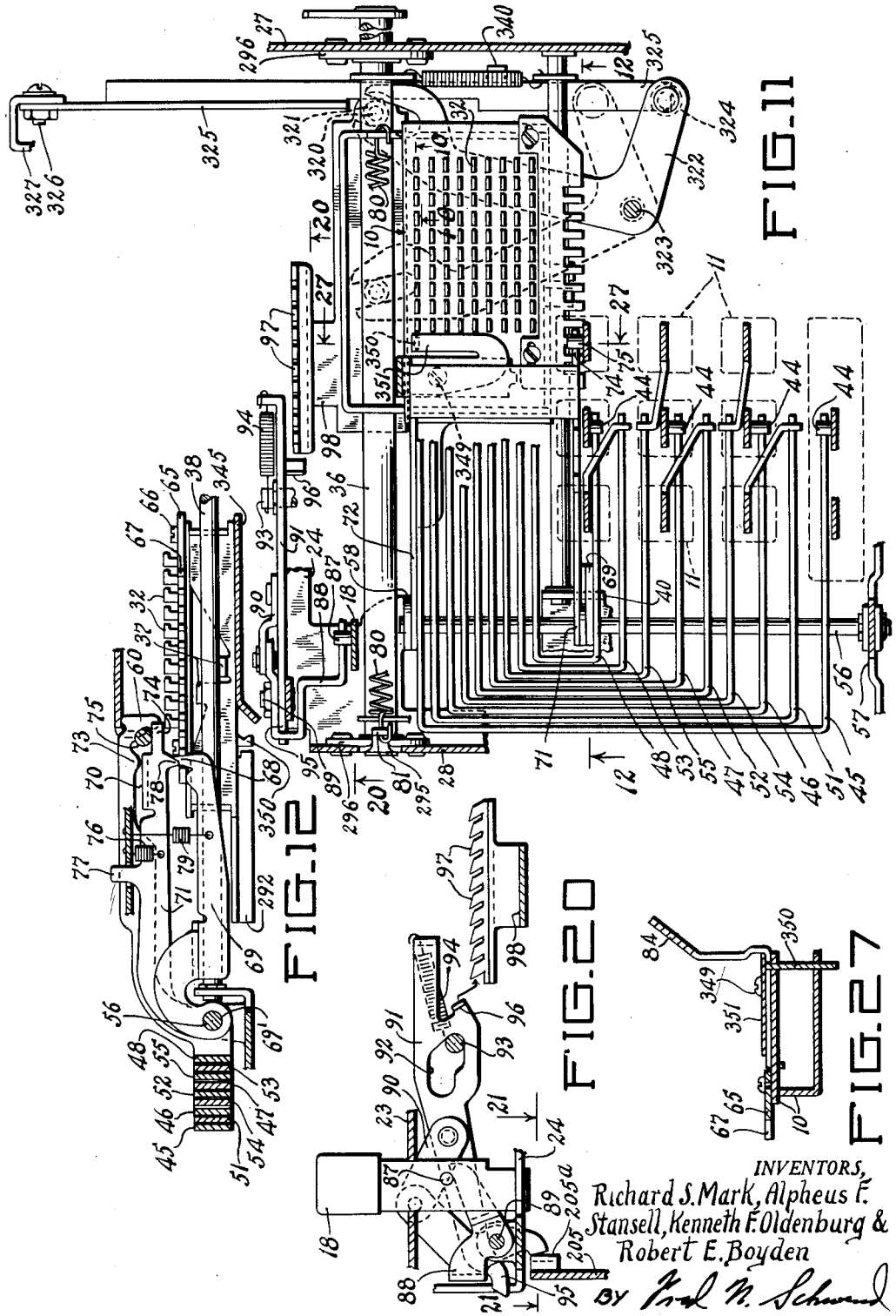

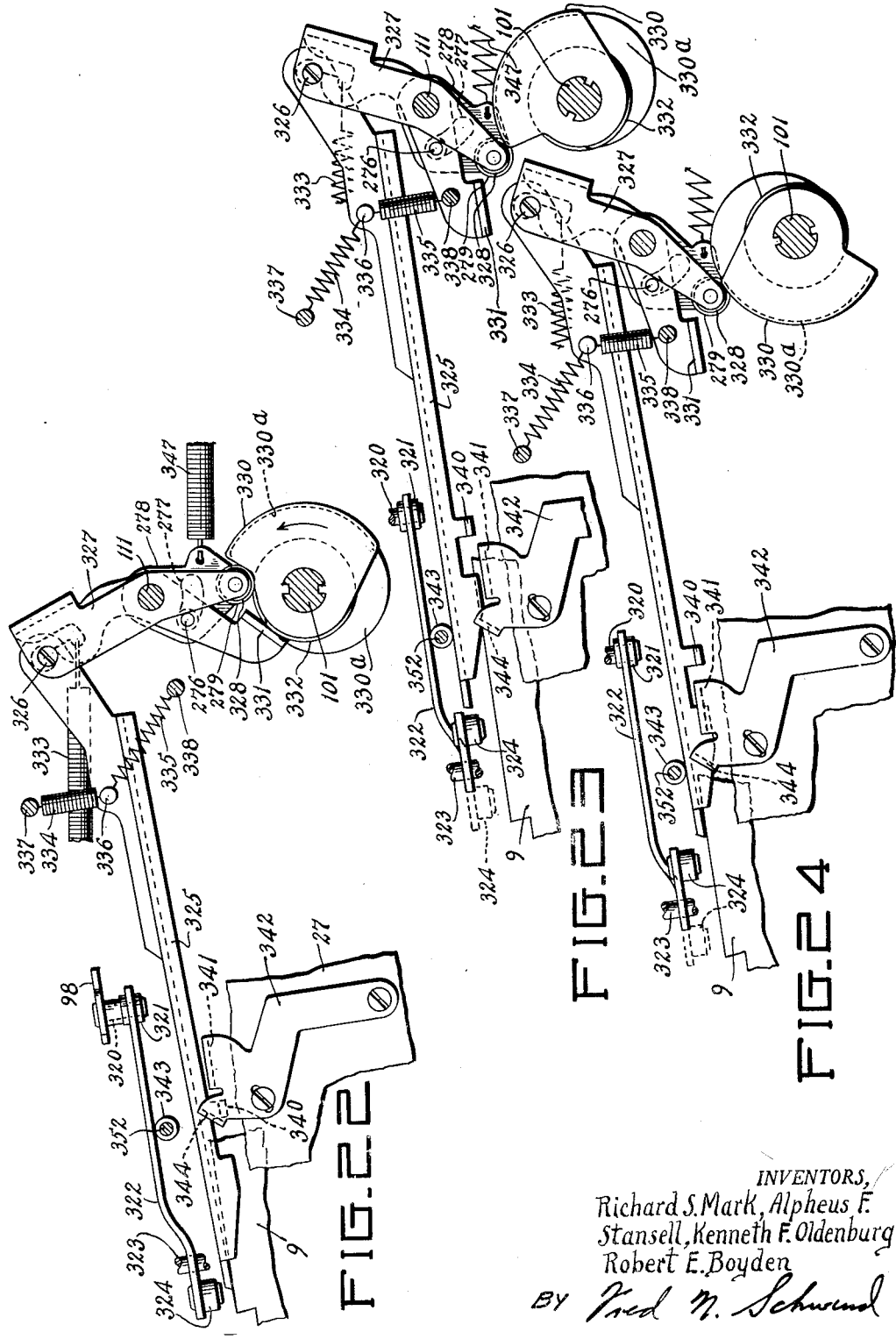

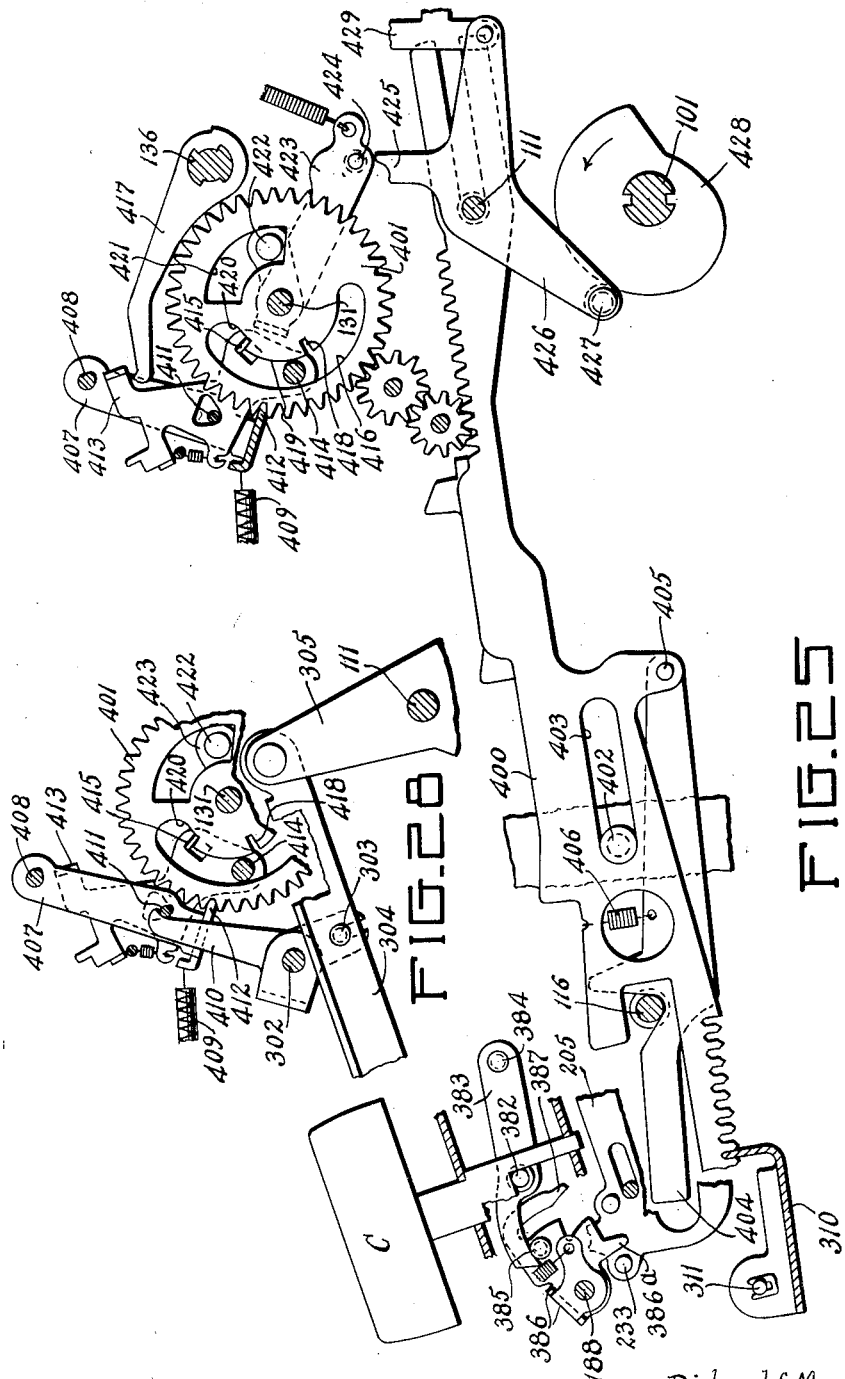

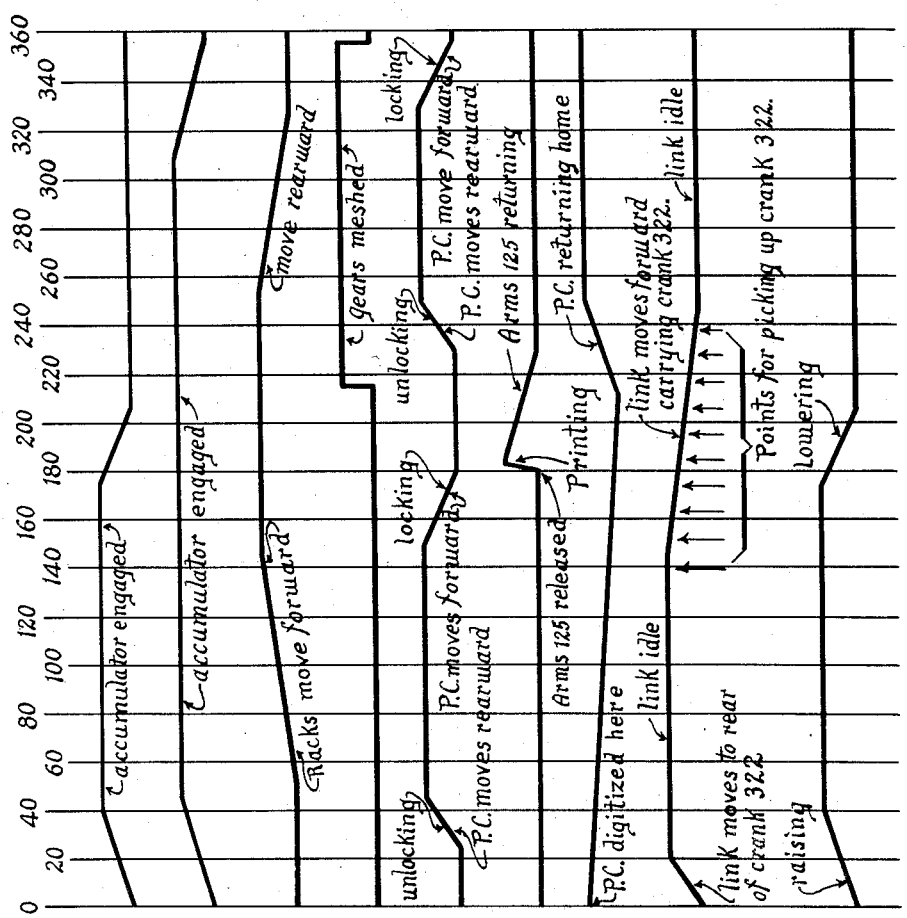

United States Patent Office 2,989,231
Patented June 20, 1961

2,989,231
CALCULATING MACHINE
Richard S. Mark, Arcadia, Alpheus F. Stansell, Puente, Kenneth F. Oldenburg, Monterey Park, and Robert E. Boyden, San Gabriel, Calif., assignors, by mesne assignments, to Sperry Rand Corporation, New York, N.Y., a corporation of Delaware
Filed May 6, 1955, Ser. No. 506,486
7 Claims. (Cl. 235—60)

This invention relates to calculating machines and has particular reference to machines of the adding, listing type having ten key amount entry keyboards for entering the factors of different calculations.

A principal object of the invention is to provide a machine of the above type having means to facilitate the performance of multiplication and division problems.

Another object is to enable a factor of new calculation to be entered into a ten key keyboard while the machine is performing a current calculation.

Another object is to enable amounts to be retained, as a constant in the pin carriage of the ten key machine of the above type during totaling and subtotaling operations.

Another object is to enable total and subtotal operations to follow repeat add or repeat subtract operations without intermediate manipulation of keys, levers or the like.

A further object is to provide an improved form of pin carriage return mechanism.

The manner in which the above and other objects of the invention are accomplished will be readily understood on reference to the following specifications when read in conjunction with the accompanying drawings, wherein:

FIG. 2 is a longitudinal sectional view illustrating the general arrangement of the keyboard, accumulator, printer and drive, and is taken substantially along line 2—2 of FIG. 1.

FIG. 4a is a sectional view showing the rack drive cams and follower linkage.

FIG. 8 is a transverse sectional view through the racks and illustrating their connection to the printer idler gears and is taken substantially along the link 8—8 of Fig. 2, certain cooperating mechanism not included in Fig. 2 being shown.

FIG. 9 is a transverse sectional view through the keyboard and is taken substantially along line 9—9 of FIG. 2.

FIG. 10 is an enlarged fragmentary sectional view through the pin carriage and is taken along the link 10—10 of FIG. 11.

FIG. 11 is a sectional plan view through the keyboard and is taken substantially along the line 11—11 of FIG. 2.

FIG. 12 is a transverse sectional view taken along the line 12—12 of FIG. 11, illustrating the pin carriage escapement mechanism.

FIG. 13 is a sectional plan view, partly broken away, of the keyboard unit and is taken substantially along the line 13—13 of FIG. 2.

FIG. 14 is a side view illustrating the mounting and mutual linkage for the add and multiply bars.

FIG. 15 is a side view illustrating the latch mechanism and mutual linkage for the multiply and divide bars and is shown in the latched as opposed to the unlatched position of FIG. 4.

FIG. 16 is a fragmentary side view illustrating the mechanism for adjusting the pin carriage longitudinally of the machine.

FIG. 17 is a sectional plan view taken substantially along the line 17—17 of FIG. 16.

FIG. 18 is an enlarged transverse sectional view of the pin carriage adjusting shaft and its bearing support, and is taken along the line 18—18 of FIG. 17.

FIG. 19 is a transverse sectional view taken along line 19—19 of FIG. 17.

FIG. 20 is a transverse sectional view illustrating the back space mechanism and is taken substantially along the line 20—20 of FIG. 11.

FIG. 21 is a sectional view taken along the line 21—21 of FIG. 20 illustrating a back-space preventative interlock.

FIG. 22 is a sectional view illustrating the pin carriage returning mechanism in full cycle condition of the machine.

FIG. 23 is a view similar to FIG. 22 but illustrating the mechanism in a position which it assumes when the machine is part way through a cycle other than the repeat cycle.

FIG. 24 is similar to FIGS. 22 and 23 but illustrates the mechanism in a condition which it assumes when the machine is part way through a cycle and with the multiply key bar depressed.

FIG. 25 is a longitudinal sectional view illustrating the clear key and its associated mechanism.

FIG. 26 is a timing chart.

FIG. 27 is a sectional view taken on line 27—27 of FIG. 11 and illustrating the zero stop pin and its spring.

FIG. 28 is a fragmentary sectional view illustrating the printer gear lock.

GENERAL ARRANGEMENT

Reference is hereby made to the Robert E. Boyden Patent No. 2,583,810, issued on January 29, 1952, for a complete disclosure of a machine in which the present invention is embodied. Therefore, for the sake of brevity, only those portions of the machine which embody the present invention or cooperate therewith will be illustrated and described herein. Also, the specific form of accumulator shown herein is disclosed and claimed in the Edward P. Drake Patent No. 2,472,696, issued on June 7, 1949. It should be understood, however, that the invention may equally well be applied to other forms of adding and calculating machines.

The machine in which the present invention is embodied is motor driven and is cyclically operable under control of a ten key keyboard and various depressible control bars. The machine, in general, comprises reciprocable drive racks 9 (FIG. 2) differentially operable under control of a pin carriage generally indicated at 10, whose pins are set in a serial manner by selected ones of the ten amount keys 11.

Figure 1:
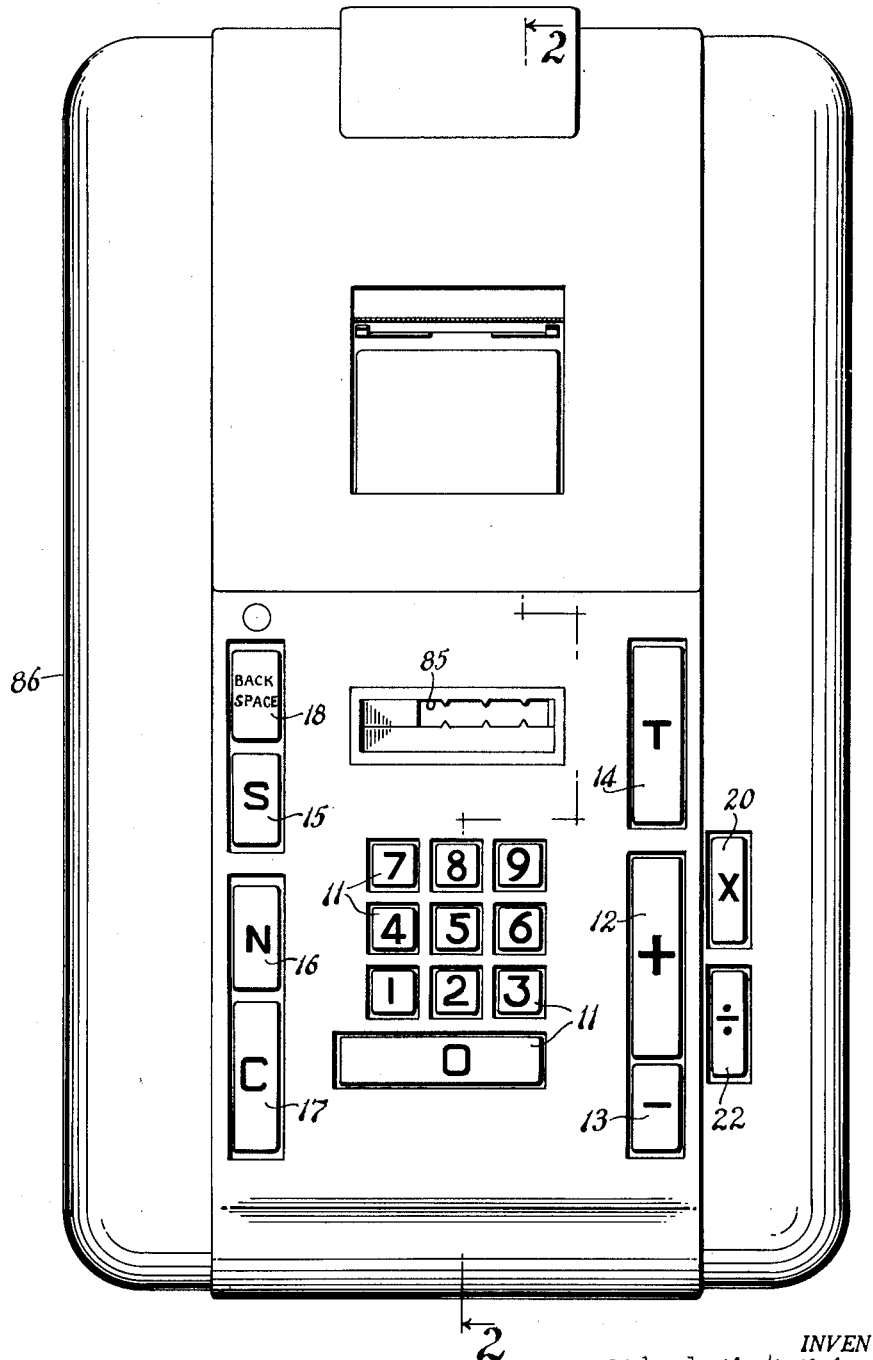
FIG. 1 is a plan view of a ten key machine of the above type embodying a preferred form of the invention.

Referring particularly to FIG. 1, amounts to be computed are entered into the machine by depressing appropriate ones of ten amount keys 11 in serial fashion, the higher-most denominational digit of the amount being entered first and the remaining digits entered successively.

Additions are performed by first entering the amounts in the keyboard and then depressing an add bar 12. Subtraction is effected by depressing a subtract bar 13 after entry of the subtrahend into the keyboard. Totals and subtotals are obtained by depressing total and subtotal bars 14 and 15, respectively. Amounts to be printed but not computed are entered into the keyboard and a nonadd key 16 depressed. In the event an error has been made in entering an amount in the keyboard, the latter may be cleared preparatory to entering a correct amount by depressing a clear bar 17. Back spacing of the pin carriage 10 relative to the racks is effected, order by order, by depressing a back space key 18.

Repetitive addition or multiplication operations are effected by entering the amount in the keyboard and depressing a multiply bar 20, holding the same down for the requisite number of cycles. When two or more digits are found in the multiplier factor, the multiply bar may be continuously held down and the pin carriage shifted laterally to multiply by successively higher order multiplied digits by merely depressing and releasing the zero amount key 11 after the appropriate number of cycles have been entered in any one order.

Repetitive subtraction or division is effected by depressing a divide key 22 and holding the same depressed until the proper number of cycles have occurred. In performing division operations, the dividend is added into an accumulator generally indicated at 19 (FIG. 2) in the usual manner. The divisor is then set into the keyboard and aligned with the dividend. Then a divide key 22 is depressed, holding the same until the machine automatically stops as an incident to negative overdrafting of the accumulator. This amount is then added back once by depressing the add bar 12. Thereafter, the divisor is shifted one denomination to the right relative to the dividend by depressing the back space key preparatory to continuing the division operation in the succeeding lower orders of the machine. Each quotient digit is indicated by the net number of subtractions performed in each ordinal position of the pin carriage.

*Keyboard*

The keyboard assembly comprises a unit, including the amount keys, control bars, pin carriage and connections. This unit is removably mounted in the frame of the machine to facilitate repair or replacement.

The keyboard unit is housed in a keyboard frame comprising a top plate 23 (FIGS. 2 and 13) which is removably attached to a bottom box frame 24. For this purpose, the frame 24 has a series of upwardly extending tongues 25 which extend through slots in the top plate 23. Taper pins 26 are driven through holes in the tongues to wedge the plate 23 against the upper edges of the frame 24.

An auxiliary bottom plate 24' provided with guide slots for the lower ends of the amount key stems is suitably secured upon the frame 24.

The frame 24 is fitted between spaced vertical side frames 27 and 28 comprising part of the main frame of the machine and is removably attached thereto by clamping means (not shown).

The pin carriage 10, which is located within the frame 24, comprises a box frame 31, the top and bottom walls of which are provided with a field of aligned slots. Slidably mounted in these slots are a plurality of rack stop pins 32 (see also FIG. 10). The stop pins are located in rows extending longitudinally of the machine, each row comprising nine pins spaced apart distances equal to the increments of advancement of the racks.

The stop pins are yieldably held in either their normal raised positions shown at the right of FIG. 10, or in their lowered position shown at the left of this figure by a plurality of folded spring elements 33 engageable with detent notches 34 formed in the different stop pins. The spring elements are nested between the top and bottom walls of the pin carriage frame 31 and are thus prevented from moving bodily up or down relative to the pin carriage.

The pin carriage is movable laterally of the machine into cooperative relation with different ones of the racks 9. For this purpose, the side walls 35 of the pin carriage have bearing holes formed therein, adjacent the rear of the pin carriage, and slideable along a support shaft 36. At its forward end, the pin carriage frame 31 has a pair of spaced ears 37 extending therefrom and embracing a second cross rod 38 which is secured at one end thereof in the keyboard frame 24 and at the other end thereof in a bracket 40 (FIGS. 9 and 11) extending upward from the floor of the frame 24.

Each of the amount keys 11 is effective upon depression to depress a corresponding one of the stop pins in one row of the carriage. As shown in FIGS. 2 and 13, the stem of each amount key is slideably mounted in the keyboard unit being guided at its lower end in a slot formed in the bottom plate 24' of the key frame 24 and at its upper end in one of a plurality of notched strips 41 removably secured by screws 42 to inwardly extending tabs 43 forming part of the top keyboard plate 23. The strips 41 are arranged in pairs extending laterally of the machine and so arranged that the stems of three of the keys are guided in corresponding notches in one strip of each pair. The second strip is effective to slideably retain the stems in the notches.

The stems of the "0", "2", "5" and "8" keys have secured thereto studs 44 (FIGS. 2 and 11) which directly overlie extending arms of bails 45, 46, 47 and 48, respectively. The stems of the amount keys "1", "4" and "7" have extensions 50 extending to the right thereof (FIG. 13) and overlying bails, 51, 52 and 53, respectively, at points in line with the aforementioned studs 44. Also, the stems of amount keys "3" and "6" extend to the left into overlying relationship with respective bails 54 and 55, also at points in line with the studs 44.

The various bails 45, etc., are nested together and pivotally mounted on a cross rod 56 which is supported at its forward end in the front wall 57 of the frame 24 and its rear end in a bracket 58 extending upwardly from the bottom wall of the frame 24. The opposite legs of the various bails 45, etc., terminate in aligned hammer projections 60 located over respective ones of the stop pins 32 in an aligned row in the pin carriage. The hammer projections are guided between depending teeth joined in a comb plate 59 secured to the plate 23 by screws 59a.

Each of the various bails 54 etc., and corresponding amount key is held in its illustrated position by a spring 61 (FIG. 9) extending between the bail and a tab 43 of the keyboard top plate 23. However, upon depression of a key, its respective bail will be rocked about rod 56, causing its hammer portion 60 to engage and depress an aligned stop pin 32 into the position illustrated by the left hand pin 32 in FIG. 10. As will become apparent hereinafter, no bail is provided for the "9" amount key since there are no stop pins corresponding in value to such key.

An escapement mechanism is provided to cause the pin carriage to be stepped laterally from one denominational order leftward to the next as an incident to depression of any amount key, including the "9" key. Referring particularly to FIGS. 11 and 12, an adjustable plate 65 attached to the frame 31 of the pin carriage as by screws 66 has a series of forwardly extending teeth 67 engageable by a tooth 68 of an escapement lever 69. The latter is pivoted at 69' upon the rod 56. A bail 70 provided with a leg 71 cooperating with the lever 69 and overlying a portion of the latter is also pivoted upon the rod 56. Another leg 72 of the bail 70 is pivoted upon the rod 56 adjacent the bracket 58. The legs of the bails 45 to 55 carrying the hammers 60 are provided with depending humps 73 overlying the web portion of the bail 70. Because no bail is provided for the "9" amount key an extension toe 74 of the leg 71 underlies a pin 75 fixed in the stem of the said amount key.

Therefore depression of any amount key will depress the bail 70 of the escapement mechanism. A spring 76 connected between a strip 41 and the leg 71 urges the bail 70 upwardly. A lug 77 extends upwardly from the leg 71 through a slot provided in the strip 41 thereby keeping a tooth 78 depending from the latter leg in alignment with the tooth 68. A spring 79 connected between the strip 41 and the leg 69 urges the tooth 68 into the notches between the teeth 67. A spring 80 is tensioned between the pin carriage 10 and a struck out portion 81 (FIGS. 9 and 11) of the key frame to normally urge the pin carriage toward the left. Upon depression of any of the amount keys, and as the hammer portion 60 of its associated bail (except the No. 9 key) depresses the corresponding pin in the pin carriage, the escapement bail 70 will be rocked downwardly causing the tooth 78 to depress and disengage the tooth 68 from engagement with one of the teeth 67 and in its place presenting the tooth 78. Accordingly, the spring 80 will be effective to advance the pin carriage to the left a slight amount. When the key is allowed to rise, the spring 76 will be effective to return the escapement bail 70 upward to its original position, removing the tooth 78 from engagement with an adjacent tooth 67 and the spring 79 will urge the lever 69 upwardly causing the tooth 68 to rise into the path of the next succeeding tooth 67 whereby the pin carriage will have advanced from one ordinal position to the next relative to the racks.

It should be noted at this point that the teeth 78 and 68 are spaced relatively close together so that the pin carriage will escape leftward only a very small portion of its total travel between adjacent ordinal positions during depression of an amount key, the greater amount of such travel occurring as an incident to retraction of the key.

In order to indicate to the operator the ordinal position of the pin carriage at all times, an indicator plate 82 (FIGS. 2 and 13) is suitably secured to the top plate 23 of the key frame. The indicator plate has a plurality of zeros printed thereacross and spaced apart the same distance as are the rows of stop pins in the pin carriage. A shutter 84 extends upwardly from the pin carriage (FIGS. 2 and 27) and overlies the indicator plate. As the pin carriage steps across the machine, the shutter 84 uncovers the various zeros to indicate the ordinal position of the pin carriage. The shutter 84 and plate 82 are visible through a well 85 located in an opening formed in a machine cover 86 suitably supported by the machine chassis.

*Backspace mechanism*

As noted hereinbefore, the backspace key 18 is effective to back space the pin carriage one step for each depression of the key. Referring particularly to FIG. 20, the backspace key 18 is slideably mounted in aligned slots in the keyboard top plate 23 and the bottom of the keyboard frame 24. A pin 87 on the stem of key 18 overlies a bail 88 pivotally supported on a frame pin 89. One arm of the bail is connected through a link 90 to a back space pawl 91. The latter has a slot 92 formed therein and arranged to guide over a stud 93 fixed to the key frame 24. A spring 94 is tensioned between the pawl 91 and the stud 93 to normally hold the pawl 91 in its position shown in FIG. 20 wherein a tail 95 of the pawl is held in engagement with the pivot pin 89 and a pawling tooth 96 lies directly above the path of movement of a series of teeth 97 formed on an extension 98 of the pin carriage.

In the event that the pin carriage is out of its normal position and the backspace key is depressed, the bail 88 will be effective, through the link 90, to force the pawl 91 to the right and downwardly about the pivot pin 89 as a fulcrum, causing the pawl tooth 96 to engage an adjacent one of the teeth 97. Further depression of the key 18 will be effective to advance the pin carriage to the right, one step. During this movement, a tooth 67 of the pin carriage, next adjacent to the left of the tooth 68 (FIG. 12) will cam the latter tooth downwardly. When the pin carriage reaches its next ordinal position to the right, the leg 69 will be permitted to snap up, positioning the tooth 68 in engagement with the next adjacent tooth 67. Upon release of the key 18, the spring 94 will be effective to return the parts to normal and to raise the key. The back space key 18 does not initiate a movement of the clutch bar 205 but when the clutch bar is moved by any other control key a humped plate 205a secured to the bar moves forward thereby preventing the back space bail 88 from rotating clockwise thus becoming an interlock. (See FIGS. 20 and 21.)

*Rack Drive*

Figure 3:
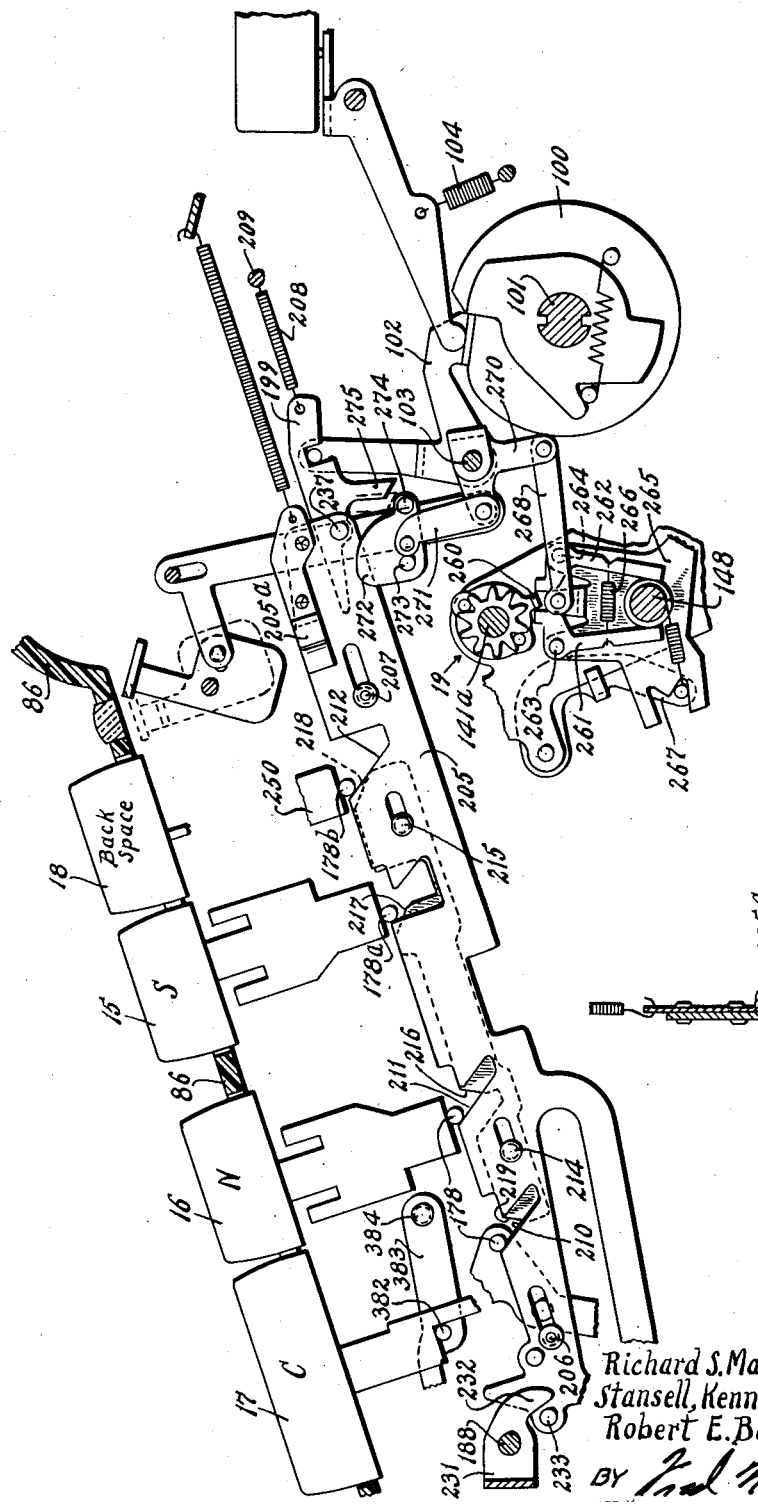
FIG. 3 is a sectional view taken along the left hand portion of the machine illustrating part of the clutch controls and the zero level cutoff mechanism.

The present machine is driven by an electric motor (not shown) suitably connected to the driving side of the cyclic clutch generally indicated at 100 (FIG. 3). The driven side of the clutch is secured to a main drive shaft 101.

The clutch is controlled by a clutch dog 102 pivoted on a frame pin 103 normaly held by a spring 104 in position to hold the clutch disengaged. Engagement of the clutch is effected by rocking the dog 102 counterclockwise under control of the various machine control bars as will be described hereinafter.

Figure 4:
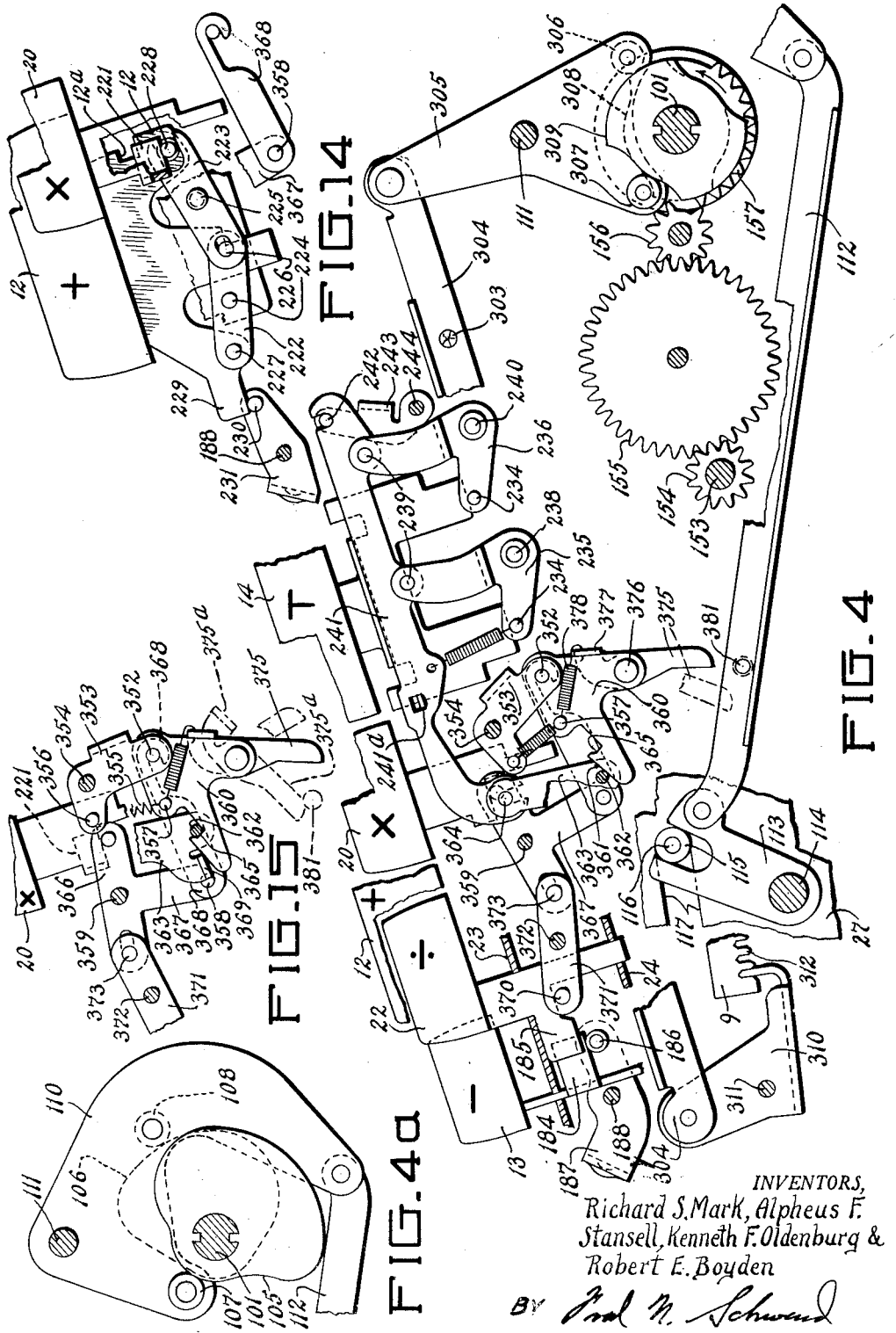
FIG. 4 is a sectional side view taken along the right hand side of the machine illustrating the rack drive mechanism, the rack lock device and other machine controls.

Means are provided for yieldably and independently transmitting a drive from the shaft 101 to the various drive racks 9 (FIGS. 2 and 8). Referring to FIGS. 4 and 4a, a pair of juxtaposed complementary cams 105 and 106 are keyed on the shaft 101. These cams are engaged by rollers 107 and 108, respectively, mounted on a cam follower 110 fulcrumed on a fixed shaft 111. The cam follower is connected by a link 112 to a bifurcated arm 113 secured to a rock shaft 114. The bifurcation of the arm 113 embraces a roller 115 rotatably mounted on one end of a rack drive shaft 116. The roller is also guided for fore and aft movement in a longitudinally extending guide slot 117 formed in the right hand machine frame plate 27. A similar roller (not shown) is provided on the opposite end of the shaft 116 and is embraced by an arm similar to arm 113, also fixed to the shaft 114, to insure parallel movement of the shaft 116 during its rack driving movement.

Referring to FIG. 2, each of the drive racks 9 has an elongated slot 118 slideably embracing the shaft 116 whereby to support the forward end of the rack, the opposite end of the rack having a slot 120 slideably supported on the shaft 111.

The slot 118 in each rack terminates in opposed lateral notches 121, and each of these depressions is normally engaged by a roller 122 carried by a drive element 123. The two drive elements associated with any one rack are spring urged toward each other in opposite directions about the shaft 116 by a tension spring 124.

When, during forward movement of the shaft 116, a drive rack is arrested, as will be described presently, the rollers 122 will ride out of the notches 121 against the action of the spring 124, thus breaking the connection between the shaft and the rack, whereupon the rollers will move along the edges of the slot 118.

It will be noted that the racks 9 are spaced apart distances greater than the distances between adjacent rows of stop pins 32 in the pin carriage. Therefore, it is necessary to condense such spacing, not only to cooperate with such stop pins, but also to actuate corresponding print wheels 125 forming part of the printer unit generally indicated at 126. For this purpose, the racks have inwardly extending overlapping extensions 127 (see FIG. 8) attached thereto and terminating in rack sections 128 which mesh with idler gears 130. The latter are independently rotatable upon a fixed shaft 131.

The rack sections 128 and gears 130 are spaced apart distances equal to the distances between the various rows of stop pins 32. Each rack section 128, is also pivotally connected at 132 to a rack stop slide 133. The latter has a shoulder 134 adapted to arrest against a depressed stop pin 32 or zero stop ledge 292 to thereby arrest the associated rack 9 in a zero position or a position corresponding to the numerical value of the pin.

*Printer*

The printer 126 comprises the aforementioned printing wheels 125, each of which has formed around the periphery thereof a series of type characters ranging from "0" to "9" and these wheels are so entrained with their associated racks 9 that they will print a digit corresponding to the value of the stop pin depressed in the associated order, or to the numerical position to which the rack is moved in its forward stroke. Each wheel is rotatably mounted on a separate arm 135 which is loosely keyed on a printer control shaft 136 and spring urged clockwise by a tension spring 137. Each printer wheel has secured thereto a gear 138 which meshes with a gear 140 also rotatably mounted on the type arm 135. The shaft 136 is normally effective to hold the arms 135 in position to maintain the gears 140 in mesh with the idlers 130.

At approximately the mid-point in a machine cycle, and after the racks have differentially advanced to positions limited by the various stop pins (or by the accumulator generally at 19 during totaling and subtotaling operations) the printer control shaft 136 is rocked clockwise by suitable mechanism (not shown), permitting the springs 137 to rock the printer arms 135 and thus carry the print wheels 125 forwardly into contact with a printing ribbon 142 and a paper tape (not shown) guided around a platen 143 to print the number registered on the wheels onto the paper. Thereafter, and before the racks have returned from their forwardly advanced positions, the shaft 136 is rocked counterclockwise to return the various type wheel levers 135 to their illustrated positions wherein the gears 140 are remeshed with the idler gears 130.

*Accumulator*

Since the accumulator unit does not in itself relate to the present invention, only those portions thereof which directly cooperate with the remainder of the machine will be described in detail. However, reference is had to the aforementioned Drake Patent No. 2,472,696 for details of such accumulator.

Figure 5:
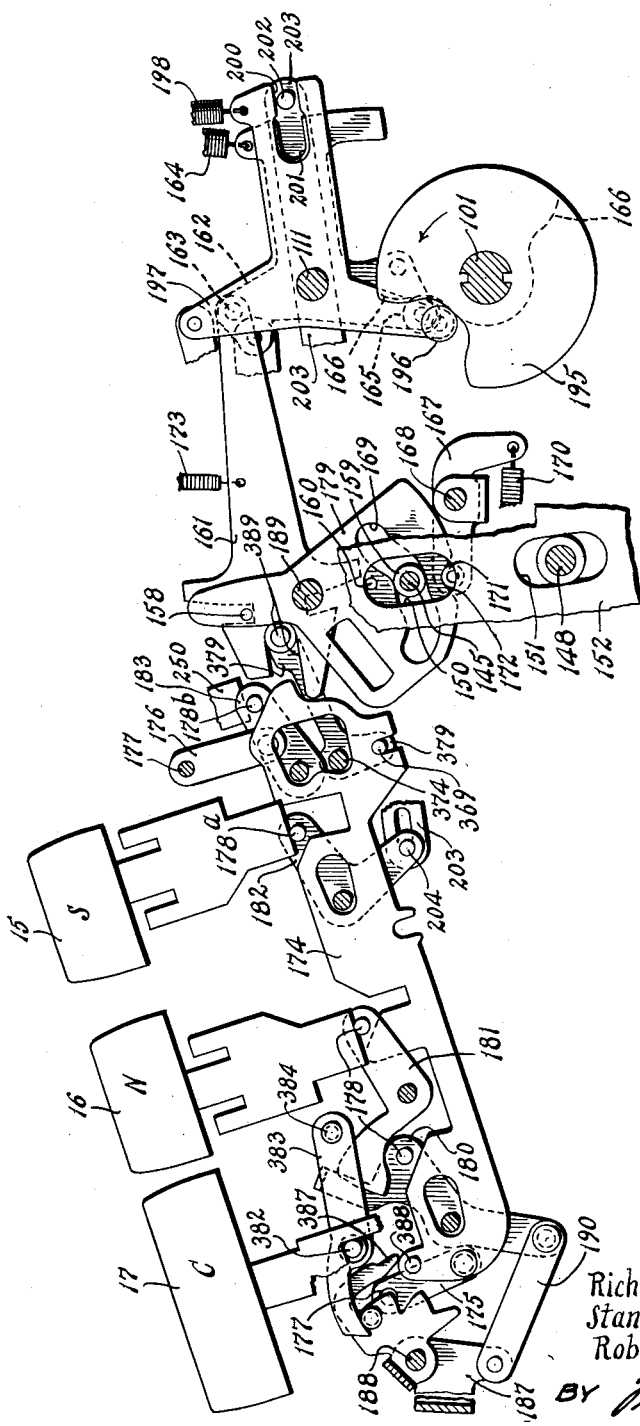
FIG. 5 is a sectional view taken along the left hand portion of the machine illustrating the accumulator positioning controls.

Referring to FIGS. 2, 3 and 5, the accumulator 19 comprises a plurality of accumulator gears, one associated with each rack 9 and all independently rotatable on an accumulator shaft 145. During an additive operation, the accumulator is raised to mesh the accumulator gears with upper rack gear sections 147 on the racks 9, whereby the gears will be rotated in a counterclockwise direction during subsequent forward rack movement. During a subtractive operation, the accumulator is lowered to mesh the accumulator gears with lower rack gear sections 146 on the racks 9 so that subsequent forward rack movement will drive the gears in a clockwise direction.

The shaft 145, and a second shaft 148 also forming part of the accumulator unit, are guided at opposite ends thereof in vertical slots 150 and 151, respectively, formed in plates 152 suitably attached in a manner not shown to the machine frame plates, i.e. 27 and 28.

The accumulator is of the subsequent transfer type in which the accumulator gears are digitized during the forward movements of the racks, i.e. during the first part of the machine cycle while, during the second part of the cycle and during return of the racks, the tens transfer operation occurs. The tens transfer mechanism includes a shaft 153 (FIG. 4) entrained with the main shaft 101 through a gear train including gears 154, 155, 156, and 157, the latter being keyed on the shaft 101.

*Accumulator controls*

Means are provided, responsive to depression of any of the machine control bars, i.e., 12, etc., to cause raising and lowering of the accumulator so as to digitize the same in the appropriate direction.

The accumulator shaft 145 is provided at each end thereof with a roller, one of which is shown at 159, the latter being embraced by a cam groove 169 formed on a box cam 179 which is pivotally mounted on a frame pin 189. A similar cam (not shown) is provided for raising and lowering the opposite end of the shaft 145 and is operatively connected to the cam 179 to operate in unison therewith.

Clockwise rocking of the cam 179 will raise the accumulator gears into mesh with the upper rack sections 147 to effect additive entries while counterclockwise rocking of the cam will lower the accumular gears to effect subtractive entries.

The cam 179 carries a pair of pins 158 and 160 arranged on diametrically opposite sides of the pivot pin 189. The paired pins are arranged to be selectively engaged by a hook member 161, the latter being pivotally connected to a three-armed cam follower 162 and at 163. The cam follower is pivoted on the shaft 111 and is normally urged counterclockwise by a tension spring 164 to normally hold a roller 165 against a cam 166 keyed on the shaft 101. The cam 166 has a high portion extending over nearly one half of its periphery whereby it is normally effective to rock the cam 156, through the hook 161, during the first porttion of a machine cycle.

Whenever the cam follower 162 engages a low portion of the cam 166, i.e. during full cycle condition of the machine and during the latter half of a cycle, the box cam 156 will be held in its neutral position to likewise maintain the accumulator gears in neutral position. In order to yieldably maintain the box cam in such position, a centralizer 167 is provided, being pivoted on a frame pin 168 and urged by a spring 170 in a clockwise position to maintain a roller 171 thereon in engagement with a centralizing notch 172 formed on the lower edge of the box cam.

Normally, during additive operations or when the machine is at rest, the hook member 161 is held in a raised position by a spring 173 so that when the hook member is moved rearwardly it will rock the box cam 179 clockwise to raise the accumulator into its additive position relative to the racks.

An accumulator positioning control bar 174 is provided under control of the various accumulator control bars, except the add bar 12, to lower the hook into either an intermediate position wherein it will be ineffective to rock the cam 179 or into a lower position wherein it will embrace the pin 160 and thus cause the cam 179 to lower the accumulator into its subtractive position relative to the racks.

The control bar 174 is supported for longitudinal movement by a pair of swinging links 175 and 176 fulcrumed on frame pins 177. The bar has a pair of inclined camming surfaces underlying pins 178, carried on arms 180 and 181 associated with the clear bar 17 and the nonadd bar 16. The subtotal bar 15 also overlies a pin 178a carried by an arm 182 which is pivotally connected to a link 255 hereinafter described. The bar 174 is also provided with an inclined camming surface underlying a pin 178b carried on an arm 183, the latter pin underlying an arm 250 hereinafter described.

In order to control the hook member 161, the bar 174 is provided with a pin and slot connection 369 with a bell crank 379. The latter is fulcrumed on a frame pin 374 and connected by pin and slot connections 389 to the hook member.

The camming surface of bar 174 which is associated with the arm 181 is so formed that depression of the nonadd bar 16 will be effective to set the hook member 161 in an intermediate position. During an ensuing cycle initiated by the bar, the accumulator will remain in neutral and value set up on the keyboard and in the pin carriage will be printed only. On the other hand, the camming surfaces of the bar 174 associated with the arms 180 and 183 are so arranged that depression of the bars associated therewith will be effective to force the hook member 161 to its lowermost position wherein it will embrace the pin 160 to set the accumulator in its subtractive position. The latter positions of the bar 174 and hook member 161 is also accomplished by the lowering of the arm 250 associated with the subtotal bar 15 and the total bar 14 as hereinafter described.

Referring to FIG. 4, the subtract bar 13 and divide bar 22 have their stems slideably mounted in aligned guide slots formed in the top key plate 23 and keyboard frame 24. The stems of these bars have projections 184 and 185 which overlie a pin 186 on one arm of a bail 187. The latter is pivoted on a cross rod 188 supported by the machine frame. A second arm of the bail (FIG. 5) is connected, through a link 190, to a depending tail on the arm 180 so that depressing of the subtract or divide bar will be effective to cause arm 180 to cam the bar 174 forwardly to its subtract controlling position.

During totaling operations, effective in response to depression of the total bar 14, the accumulator is returned to zero during the forward movement of the racks, and at the mid-point in the cycle, the same is raised to its neutral position and remains there until the end of the cycle, leaving the same in the zero or cleared condition. However, during subtotal operation, controlled by the subtotal bar 15, the accumulator remains in its lower subtractive position throughout the cycle so as to reenter the amount which is initially cleared therefrom during the process of subtotaling and printing. For this purpose, a cam 195 is keyed on shaft 101 in juxtaposition to cam 166. This cam is provided with a high portion extending around the major portion of the periphery thereof and is engaged by a roller 196 carried by a three-armed cam follower 197 pivoted on the shaft 111. The latter is urged counterclockwise by a tension spring 198 to maintain the roller 196 is engagement with the cam 195 and is provided with a slot 200 which normally extends in alignment with a relatively shorter slot 201 formed in the cam follower 162. A stud 202 carried on the right hand of a link 203 (FIGS. 6 and 7) is normally held by spring means (not shown) in position resting solely in the longer slot 200. The link is connected through a pin and slot connection 204 to a depending extension of the subtotal bar operating-arm 182.

Normally, the bell cranks 162 and 197 operate independently of each other under control of their respective cams 166 and 195. However, upon depression of the subtotal bar 16 the link 203 will be actuated to the left, positioning the stud 202 in engagement with both slots 200 and 201, causing the bell crank 162 and hook 161 to partake of the movement of bell crank 197 under control of cam 195. Therefore, the hook 161 which, during subtotaling operations is held in its lowermost subtractive position, will be held rearward throughout the major portion of the cycle to accordingly maintain the accumulator in mesh with the lower rack sections throughout both the forward and return movements of the racks.

*Clutch controls*

Operation of the machine and engagement of the clutch 100 (FIG. 3) is effected upon depression of any of the motor operation control bars 12, 13, 15, 16, 17, 20 and 22. For this purpose, the aforementioned clutch control dog 102 is normally connected to a hook 199 which is pivoted at 237 to a clutch control bar 205. The latter is provided with slots guided over frame pins 206 and 207 and is urged to the right by a tension spring 208 extending between the hook 199 and a frame stud 209.

The control bar is provided with inclined camming slots 210, 211 and 212 cooperative with the pins 178 and the pin 178b associated with the subtract, nonadd, subtotal and total bars whereby depression of any one of these bars is effective to cause its respective pin 178 or 178b to directly cam the clutch control bar 205 forwardly against the combined action of springs 104 and 208 to thereby rock the dog 102 and cause engagement of the clutch.

For the purpose of effecting proper operation of the clutch control bar under all circumstances, a second clutch control bar 213 is provided in juxtaposition with bar 205 and is slideably mounted thereon for limited movement relative thereto by pin and slot connections 214 and 215. The latter bar is provided with inclined camming surfaces 216, 217, and 218 cooperating with the pins 178, 178a and 178b associated with the nonadd, subtotal and total bars, respectively. An inclined camming surface 219 on the bar 213 also cooperates with the pin 178 associated with the subtract bar 13 and the divide bar 22 through the bail 187. In the event that the subtract bar 13, the divide bar 22, or the nonadd bar 16 has been depressed thereby camming the control bar 213 rearwardly, and during the ensuing cycle the total or subtotal bars 14 and 15, respectively, is depressed, the pin 178a or 178b associated with the depressed one of the latter bars will normally engage and be cramped by one of the inclined camming surfaces 217 and 218 on the control bar 213 thus preventing further depression of such latter depressed bar. However, should such bar be depressed after the clutch control bar 205 were halfway through its return movement, the pin 178a or 178b associated with the respective subsequently depressed bar would engage the inclined camming surface 217 or 218, and thus through the opposite inclined surface 216 or 219 force an arm 180 and its entrained linkage, including the initially depressed bar 13, 22 or 16 upward.

Describing now the add bar 12 and its connection to the machine controls, the stem of this bar is slideably mounted in a slot provided in the keyboard top plate 23. However, in order to prevent binding of this bar in the event that finger pressure is exerted along one or the other end thereof, a parallel motion device (FIG. 14) is provided comprising levers 222 and 223 pivoted on frame studs 224 and 225, respectively. The levers are pivotally connected at their adjacent ends by a pin and slot connection 226. At their opposite ends, such levers are pivotally connected at 227 and 228, respectively, to the extremities of the key stem, the pivot pin 228 being fixed in the key stem but engaging a slot 228a in the lever 223 such linkage thereby insuring parallel vertical movement of the add bar regardless how the same is depressed.

A forwardly extending foot 229 on the key stem of the add bar 12 overlies a pin 230 on a control bail 231, the latter being pivoted on the aforementioned rod 188 and provided at its opposite end with a shoulder 232 (FIG. 3) which lies directly behind a pin 233 on the clutch control bar 205. Thus, depression of the add bar will be effective to actuate the clutch control bar 205 in the same manner as the other machine control bars.

The multiply bar 20 is slideably mounted in aligned slots in the key plate 23 and frame 24 and is provided with an extension (FIG. 14) bent back over itself into a hook like shape with the extremity of the hook 221 overlying the pin 228 whereby depression of the mutiply bar will make use of the add bar linkage thereby causing depression of the add bar and thus effecting operation of the machine.

An interlocking bell crank 241a is provided between the total key 14 and the add key 12 so that neither can be depressed while the other is depressed. The bell crank is pivoted upon the key plate 23 at 23a. One arm of the crank protrudes through a hole provided in the link 241 so that as the total key 14 is depressed the link will move the crank clockwise (FIG. 13) until the other arm of the crank enters a notch 12a (FIG. 14) of the stem of the add key 12 thereby holding the latter key up. Should the add key be depressed first the notch 12a will pass beneath the plane of the crank arm which will then butt against the side of the add key stem and thereby to prevent the movement of the link 241 of the total key.

Figure 6:
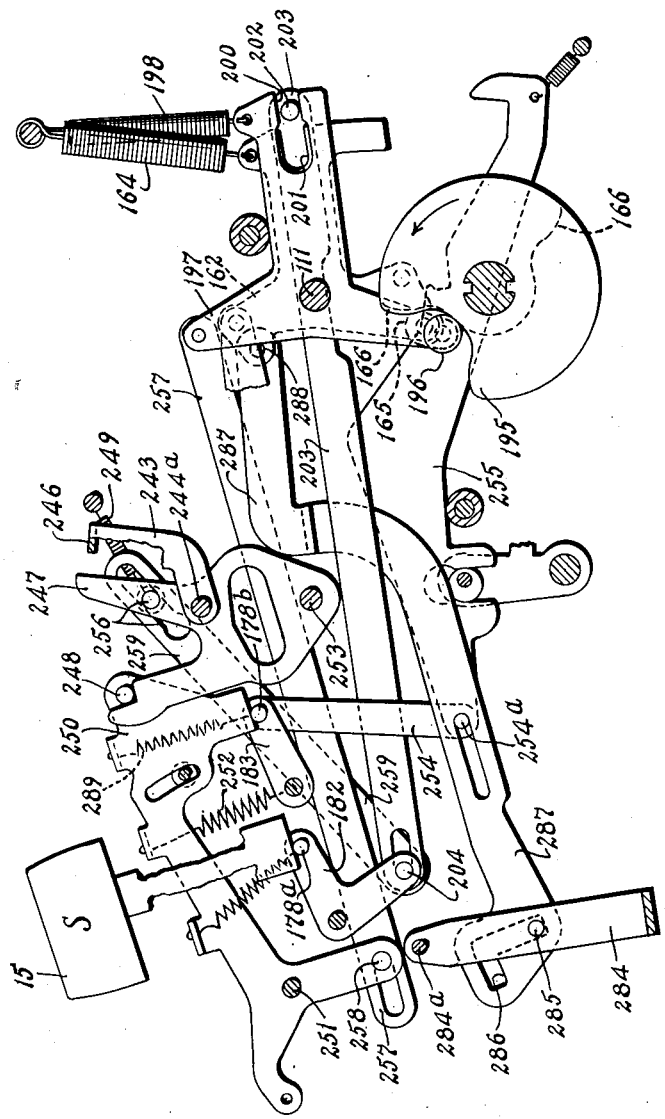
FIG. 6 is a side view illustrating the machine controls operable in response to depression of the total and subtotal bars.
Figure 7:
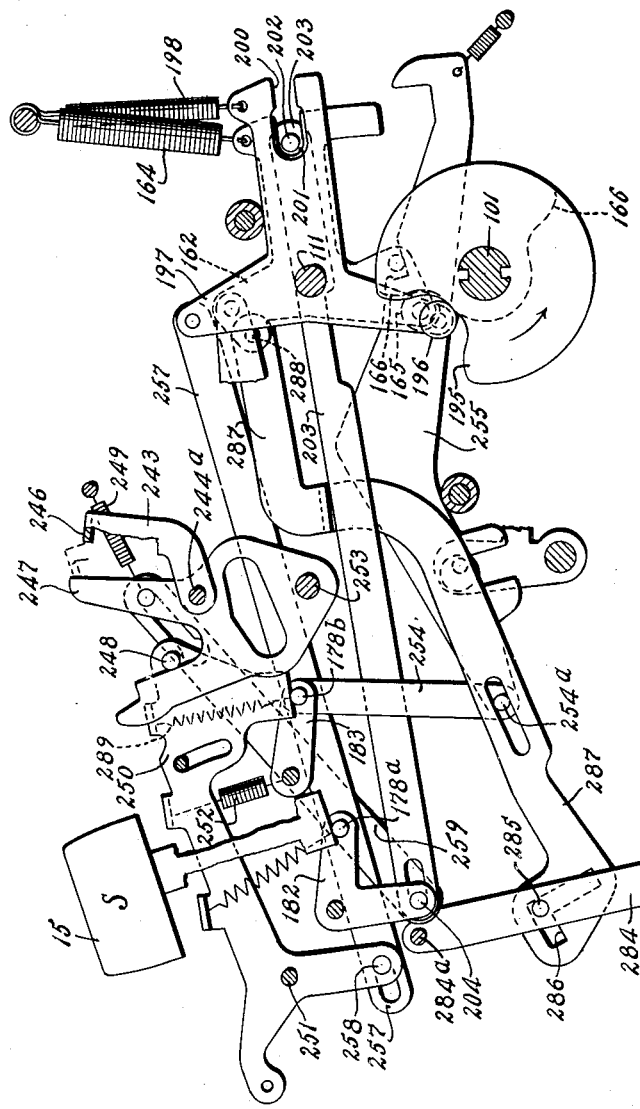
FIG. 7 is a view similar to FIG. 6 but illustrating the mechanism tripped in response to depression of the subtotal bar to cause a machine operation.

A power assist mechanism is provided under control of the total and subtotal bars so that finger pressure necessary to depress such bars is reduced to a minimum. Referring to FIGS. 4, 6 and 7 in particular, the total bar 15, which is slideably mounted in aligned slots in the key plate 23 and frame 24, overlies pins 234 mounted on bell cranks 235 and 236 fulcrumed on frame pins 238 and 240, respectively. The latter bell cranks are pivotally connected at 239 to a link 241 which is coupled through a pin and slot connection 242 to a bail 243, pivotally mounted on coaxial frame studs 244 and 244a. An ear 246 on the bail lies directly behind a latch 247. The latter is provided with a latching shoulder normally engaging a pin 248 on an actuator arm 250. The arm is fulcrumed on a frame pin 251 and is urged downwardly by a relatively strong spring 252. A foot on the lever 250 overlies the pin 178b carried by the arm 183 (FIG. 5). Therefore, upon depression of the total bar, the bail 243 will rock counterclockwise, forcing the latch 247 about its pivotal support 253 and against the action of a tension spring 249 to release the lever 250. The latter will then depress the pin 178b, thereby causing a total operation to ensue. A link 254 is pivoted at one end upon the pin 178b and carries a pin 254a at its other end for a pivotal connection to one end of a floating lever 255. The latter is similar in construction and function to the floating lever 290 found in FIGS. 22 and 23 of the aforementioned Boyden Patent No. 2,583,810, for the purpose of controlling totaling and subtotaling operations.

As mentioned heretofore, the subtotal bar 15 is effective to directly rock its associated arm 182. The latter is pivotally connected to a link 259 having a pin and slot connection 256 with the latch 247. Thus the subtotal bar will also be effective to release the latch 247.

The arm 250 is recocked soon after the start of a total or subtotal cycle by the cam 195. For this purpose, the cam follower 197 is connected to a link 257, the forward end of which is coupled through a pin and slot connection 258 to a depending extension of the lever 250. As the cam follower 197 is rocked by cam 195, the link 257 (after some lost motion due to the slot 258) will rock the arm 250 upwardly until the latch 247 can be moved into latching position by its spring 249.

Means are provided under control of the accumulator for arresting operation of the machine when an overdraft occurs. This feature enables division calculations to be readily performed on the present machine, as will be apparent hereinafter.

It is a well known characteristic of accumulators that when a positive amount is subtracted from a smaller amount registered by the accumulator, a negative overdraft will occur and the accumulator gears in all orders to the left of those being digitized will turn from "0" to "9" registration due to the borrowing action of the transfer mechanism. Correspondingly, when a positive amount is added to a smaller negative amount registered by the accumulator a positive overdraft will occur and the accumulator gears in orders to the left of those being digitized will change from "9" to "0" registration.

As shown in FIG. 3, the highermost order accumulator gear 141a is provided with a special tooth 260 which, when the gear is located in "0" registration, as illustrated, extends between the adjacent tails of a pair of opposed bypass pawls 261 and 262 pivotally mounted at 263 and 264, respectively, on a rocking plate 265. A spring 266 extends between the pawls to normally maintain the same in their illustrated relative positions on the plate, wherein downwardly extending portions thereof engage the opposite sides of the shaft 148.

The plate 265 is pivotally mounted on the shaft 148 and is settable by the accumulator gear tooth 260 (through the pawls 261 and 262) into either its position shown or another position counterclockwise of its illustrated position. A spring pressed centralizer 267 is effective to hold the plate in either of these positions.

The plate 265 is connected by a link 268 to a bail form bell crank 270 pivoted on the pin 103. The bell crank, in turn, is connected through a link 271 to a camming lever 272 pivoted on a frame pin 273. A pin 274 on the lever is engageable with an extension 275 on the aforementioned clutch dog control hook 199. When any of the machine control bars are depressed to cause machine operation, the hook 199 will, as noted herein before, be moved to the left and held there as long as the bar is depressed, thus, placing its extension 275 in the path of the stud 274.

In the event that a negative overdraft occurs during depression of the minus or divide bars, the gear 141a will be advanced one increment in a clockwise direction, causing its tooth 260 to engage the tail of the pawl 261, rocking the plate 265 counterclockwise and, through the linkage 268, 270, 271 and 272, to cause the stud 274 to cam the hook 199 upwardly about its pivot 237. This will release the clutch dog 102, enabling the spring 104 to return the same to clutch disengaging position thereby arresting operation of the machine even though the minus or divide bar is held depressed. When such bar is released to rise, the spring 208 will pull the clutch bar 205 rearwardly and the hook 199 will again reengage the clutch dog.

Whenever a negative overdraft is corrected, as by adding into the accumulator the original amount subtracted therefrom, or an amount greater than the deficit registered thereby, all accumulator gears to the left of the orders being digitized will be advanced from "9" to "0" registration and the tooth 260 of the aforementioned gear 141a will, accordingly, be moved counterclockwise, engaging the tail of the pawl 262 to return the plate 265 and linkage connected thereto back to their original full line position shown in FIG. 3. This action will cause the stud 274 to traverse its path in the reverse direction and again release the hook 199 to arrest the machine.

*Rack stop controls*

Means are provided to enable a new entry to be made into the keyboard while a machine is performing a calculation on an entry already set up on the pin carriage. For this purpose, the various rack stop slides 133 (FIG. 2) are normally located, as shown, for movement in a path extending below depressed ones of the stop pins 32, a yieldable stop pin 350 or the zero stop ledge 292 (FIGS. 9, 12 and 27). The rack stop slides are raised into paths where they will be arrested by the pin 350, the ledge 292 or the depressed stop pins at the start of all cycles except those involving totaling and subtotaling and are lowered out of such paths during the latter half portions of the cycles. Thus, while the racks are returning to their home positions, the slides are lowered so that the pin carriage may be independently returned to its home position and the stop pins raised, permitting new amounts to be entered therein by the amount keys before the machine has completed its cycle. The various rack stop slides are provided with slots 280 which slidably engage a bail rod 281. The latter is carried by a bail 282 pivoted on a cross rod 283 supported at one end by the frame 27 of the machine and at the other end by a bracket 28a riveted to the frame 28. A second bail 284 (FIGS. 6, 7 and 9) is suitably attached to the bail 282 (FIG. 9) and is likewise pivoted at one end on the rod 283 and at the other end on a pin 284a fixed in the bracket 28a and coaxially aligned with the rod 283. The latter bail carries a stud 285 which is normally embraced by (as seen in FIG. 6) the lower end of an L-shaped slot 286 formed in the forward end of a link 287. This link is pivotally attached at 288 to the aforementioned cam follower 162. The forward end of the link 287 is normally held in its upper illustrated position by a slotted connection 290 with the pin 254a carried by the link 254. It will be recalled that the link 254 is pivotally connected to the stud 178b of the arm 183, the latter being normally held in raised position by a tension spring 289 (FIG. 6) connected between the arm and the lever 250. Therefore, upon machine operation, other than totaling and subtotaling, the combined bails 282 and 284 will be rocked counterclockwise, raising the bail rod 281. This will move the rack stop slides 133 upwardly into paths which may then be blocked by a lowered stop pin 32, the zero stop ledge 192 or a yieldable zero stop pin 350, any one of these being indicated by the dot-dash lines 133a against which the shoulders 134 will arrest to accordingly position the racks 9. It will be recalled that the cam follower 162 is normally returned at the end of the half cycle, thereby lowering the rack stop slides at this time and before the racks are returned from their advanced positions.

Upon initiation of the total or subtotal operation, as indicated in FIG. 7, the lever 250 will be released by the latch 247. In moving downward, the lever will engage and lower the pin 178b, thereby lowering the link 254, and consequently the link 287, to its position shown in the latter figure. Thus, the horizontal portion of the L-slot 286 will be aligned with the pin 285. Accordingly, the link 287 will be ineffective to actuate the bail 284 and the rack stop slides will remain in their normal lowered positions during the ensuing totaling or subtotaling operation. This feature enables a totaling or subtotaling operation to take place even though the pin carriage has an amount set thereinto either as a result of inadvertent entry of such amount previous to a totaling operation or as a result of a previous repeat operation wherein the pin carriage is allowed to remain in a pre-set position following such operations.

*Pin carriage controls*

As shown particularly in FIGS. 9 and 12, the pin carriage frame 31 includes a zero stop ledge 292 which extends to the left of the pin carriage. When the pin carriage is in its illustrated home position, the ledge 292 or a zero stop pin 350 (hereinafter described) is directly in front of the various rack stop shoulders 134, and in line with the rearmost "0" stop pins 32 to prevent forward movement of the racks and their stop slides. In the event the pin carriage has been stepped only partly across the machine during entry of an amount therein, the zero stop ledge 292 will be located directly in front of those racks which are to be held in zero position, i.e. to the left of the rack in which the highermost significant digit is entered.

Means are provided to insure free movement of the stop pins 32 of the pin carriage relative to the stop shoulders 134 of the stop slides 133 during entry of amounts into the pin carriage and consequent sideways stepping of the pin carriage, while eliminating overthrow of the racks beyond their "0" or other numerical positions. For this purpose, the pin carriage is adjusted longitudinally of the racks at certain times during the machine cycle. The pin carriage support shaft 36 (FIGS. 2, 16, 17 and 18) is rotatably mounted in the side walls of the keyboard frame 24 for slight movement longitudinally of the machine. Springs 294 yieldably urge the shaft 36 forwardly of the machine and, in full cycle position of the machine, cut out flat portions 295 on the shaft 36 are located in engagement with the rear edges of wear plates 296 secured to the opposite side walls of the frame 24 as by rivets 297.

Suitably attached to the shaft 36 is an arm 298, coupled through a pin and slot connection 300 to a bell crank 301. The bell crank is pivoted on a frame pin 302 and is coupled through a pin and slot connection 303 to a rack lock control link 304 (see also FIG. 4). The latter is pivotally connected at its rear end to a cam follower 305 pivoted on the cross shaft 111 and provided with rollers 306 and 307 engaging the peripheries of juxtposed complementary cams 308 and 309 keyed on the shaft 101. The forward end of the link 304 is pivotally connected to a rack lock bail 310 which extends across the machine and is pivotally supported at its opposite ends on frame pins 311. The bail is engageable between teeth 312 (see also FIG. 2) formed on the under edges of the racks 9 to locate the same in the differential numerical positions in which they are arrested by the stop pins.

Normally, when the machine is in full cycle condition, the cams 308 and 309 are effective to hold the rack lock 310 in engagement with the teeth 312 of the racks and to hold the shaft 36 in such position as to locate the cut out portions 295 in their relative positions shown by the full lines in FIG. 18 whereby adequate space is provided between the zero stop pins 32 and the stop shoulders 134 to permit lateral movement of the pin carriage without interference. However, when the pin carriage has been stepped to different positions as an incident to entry of amounts in the keyboard and the machine is operated, the cams 308 and 309 are effective to first draw the link rearward, removing the rack lock bail 310 from engagement with the racks and causing bell crank 302 to rock the arm 298 and shaft 36 clockwise, moving the shaft 36 into its position shown by the dot and dash lines 36a of FIG 18. Consequently, the shaft and the pin carriage will be bodily moved rearwardly by an amount represented by the gap A (FIG. 2). Now, as the rack drive commences, the racks will be arrested in their proper positions by the zero stop ledge 292 or any depressed ones of the stop pins 32.

In cases where the "9" key has been depressed, no corresponding stop pin 32 will have been depressed and the associated rack will be allowed to advance a full nine increments of travel until a strike shoulder 314 thereon engages the rear edge of the rack lock bail 310. At substantially the mid-point in the cycle preparatory to the printing operation, the cams 308 and 309 will advance the link 304 in a forward direction causing the bail 310 to again engage the racks and causing the pin carriage to retract forwardly, away from the stop shoulders 134. After the printing operation and just before the racks are returned, the cams 308 and 309 become effective to retract the lock bail 310 from the teeth 312. Toward the end of the cycle, and after the racks have returned, the cams 308 and 309 become effective to again cause the lock bail to lock the racks in their home positions and to enable the pin carriage to be adjusted forwardly by the springs 294 to the position of FIG. 2 as the shaft 36 returns to the full line position of FIG. 18.

The pin carriage is returned to its home position and all depressed stop pins raised during the latter half of a machine cycle initiated by any of the motor control bars except the multiplication bar 20 and the division bar 22. As will be noted in reference to FIG. 26, the pin carriage is returned before approxiamtely 250° of the cycle has been completed so that new amounts may be entered before the machine has completed a current cycle. For this purpose, the pin carriage frame 31 has a stud 320 (FIG. 11) extending downwardly therefrom, on which is mounted a roller 321 embraced by a bifurcated bell crank 322. The latter is pivoted on a pin 323 attached to the keyboard frame 24 and carries a roller 324 engageable by a reciprocating link 325 (see also FIGS. 22, 23 and 24). The link 325 is pivoted at 326 to a ball type cam follower 327. The latter is fulcrumed on the shaft 111 and one leg thereof carries a roller 328 engageable with the periphery of a pin carriage return cam 330 keyed on the drive shaft 101. The other leg of the bail is provided with a laterally extending foot 331 engageable with a rubber roll 332 fitted over the shaft 101. The outer diameter of the roll is of slightly greater radius than the radial dimension of the lowest portion of the cam 330 so that, as the cam follower drops toward such lower portion during a machine cycle, it will be arrested by the rubber roll. This reduces shock and noise which would otherwise occur if the roller 328 were to directly strike the cam. The follower leg having the foot 331 also carries a pin 276 engaging an arcuate slot 277 provided in an auxiliary follower 278 also fulcrumed on the shaft 111. The follower 278 carries a roller 279 engageable with the periphery of an auxliary return cam 330a keyed on the shaft 111 adjacent the rubber roll 332.

A relatively strong spring 333 is tensioned between the cam follower 327 and a suitable part (not shown) of the keyboard frame, urging the link 325 in a forward direction. In the home position illustrated in FIG. 22, the roller 328 stands apart from direct engagement with the cam 330 while the roller 279 does engage the surface of the cam 330a. This is so that as the shaft 101 starts to rotate the pull of the slot 277 against the pin 276 may be relieved hereby relieving the drag of the foot 331 against the roll 332 prior to the advance forwardly of the link 325. Another purpose of the two cams and followers will be hereinafter described.

A pair of oppositely extending springs 334 and 335 are connected at their adjacent ends to a stud 336 on the link 325 and at their opposite ends to respective frame studs 337 and 338.

The link 325 is provided adjacent its forward end with a laterally extending ear 340 which is arranged to be guided under or over a ledge 341 formed on a bracket 342 which is adjustably secured to the righ hand side frame 27.

The arrangement of the springs 334 and 335, and their respective anchoring studs 337 and 338 is such that when the link 325 is in its normal forward position shown in FIG. 22, the spring 335 will be extended a greater amount than spring 334 and will accordingly bias the link 325 downwardly to a position wherein the ear 340 is located under the plane of the ledge 341. In this position the forward edge of link 325 will be located below the roller 324 and will rest upon the edge of one of the racks 9. Accordingly, during an ensuing cycle, the ear 340 will ride along the under surface of the ledge 341 as the link 325 is drawn rearwardly. However, as the link approaches its rearmost position, the stud 336 will move toward a position closer to the stud 338 than the stud 337 and therefore the condition of the springs 334 and 335 will be reversed, the spring 334 being extended a greater amount, thereby biasing the link 325 upwardly. As the link nears its rearmost position illustrated in FIG. 23, the ear 340 will pass beyond and from beneath the ledge 341, thereby permitting the spring 334 to snap the link to its upper position wherein it is limited by a roller 343 carried on a pin 352 hereinafter described and wherein its ear 340 will be located above the plane of the guide ledge. In this position, the forward edge of the link will be located directly in line with the roller 324 of the pin carriage return bell crank so that as the link is allowed to be advanced by the decline of the cam 330 under the pull of the spring 333 during the latter half of the cycle it will pick up the roller 324 and thus return the pin carriage to its right most home position indicated by the broken line position of the roller 324. During this movement the ear 340 will ride on the upper surface of the guide ledge 341 until the forward extremity of its travel is reached, whereupon the conditions of the spring 334 and 335 will again have reversed and as the ear 340 passes the guide ledge, it will again drop to its position shown in FIG. 22, out of the path of roller 324.

In order to positively insure that the link 325 drops to its lower initial position, an inclined deflecting ear 344 is formed on the bracket 342 which is effective to deflect the ear 340 downwardly in the event the spring 335 may lag in its action at this time. The aforementioned action of the springs 334 and 335 is obtained by locating the stud 337 directly over the stud 336 when the link is in forward position shown in FIG. 22 and by locating the stud 338 directly under such stud 336 when the link is in its rearward position.

Referring in particular to FIG. 9, the stop pins 32 are returned to their raised positions during return of the pin carriage to its righthand home location by a stationary cam plate 345 which extends the length of the different rows of pins and is suitably secured to the bottom of the keyboard frame 24. The cam plate has a deflecting portion 346 against which depressed ones of the stop pins engage and are deflected upward during return of the pin carriage.

In the home position of the pin carriage, as indicated in FIG. 9, the left-most row of stop pins 32a are located over the lower edge of the deflecting portion 346 of the cam plate 345. Normally, a pin in the row currently underlying the hammer portions 60 of the various key actuated bails may be depressed without striking the deflecting portion, since by the time the pin reaches its lowermost position, the escapement tooth 68 (FIG. 12) of the escapement lever 69 has been removed from engagement with the adjacent tooth 67 of the pin carriage, permitting the same to move through the initial portion of its escapement movement to carry the depressed pin past such deflecting portion. However, in the event that an amount key is depressed very rapidly, and before the carriage stepping spring 80 is effective to advance the pin carriage through such initial portion of an escapement step, the associated stop pin will become effective as it will engage the deflecting portion 346 and positively cam the pin carriage to the left.

It will be appreciated that during the return of the pin carriage to its home position, the latter must overtravel somewhat beyond its position illustrated in FIG. 9 to cause the left most row of pins 32a to pass completely over the deflecting portion 346 so as to cam any depressed pin in the row to its upper position. At the limit of its rightward movement the carriage is arrested by a buffer comprising a roll 348 of felt or similar material mounted on the shaft 36 whereby to reduce the shock incident to arresting the pin carriage. However, in order to prevent the zero stop ledge 292 from striking the deflecting portion 346 of the cam plate during such overtravel and yet insuring that there is no possibility of a rack stop slide 133 moving between the ledge and the adjacent "0" pin in any position of the pin carriage, a yieldable zero stop pin 350 is provided, being slideably mounted in aligned slots in the top and bottom walls of the pin carriage frame in alignment with the remaining "0" stop pins 32. A leaf spring 351 (FIGS. 11 and 27) is attached to the upper surface of the pin carriage frame by a screw 349 and presses downward on the stop pin 350 to normally hold the same in its lower position. However, during the rightward overtravel movement of the pin carriage, the pin 350 will be deflected upwardly by the deflecting portion 346 of the cam plate but due to the leaf spring action will then return as the pin carriage settles into its home position.

It is possible that a large amount entry or an inadvertant placement of the hand on the amount keys might lower so many pins in the carriage as to burden the carriage return mechanism so that the reaction of the spring 333 would be slower than the rotation of the cam 330. In such event the roller 328 would not immediately follow the decline of the cam thereby permitting the roller to hammer down upon the low surface of the cam at a later time. Therefor the rubber roller 332 is provided so that the foot 331 will strike the roll and absorb the blow. In the event the spring 333 proves inadequate to return the pin carriage due to the overburdened condition an auxiliary spring 347 would aid the former spring by pulling the left end of the slot 277 against the pin 276. However the cam 330a is provided with a longer and slower decline thereby avoiding a sudden hammering.

*Repeat controls*

It is essential during the performance of repeat, multiplication and division operations that the pin carriage be retained in its preset condition throughout two or more successive cycles so that repetitive operations may be effected without having to reenter the amount into the keyboard. For this purpose, the pin carriage restoring link 325 (FIGS. 22, 23 and 24) is rendered ineffective to return the pin carriage from any position in which it may be located.

Referring to FIGS. 4 and 15 in particular, the aforementioned roller 343 (FIGS. 22, 23 and 24) overlying the link 325 is carried on a pin 352 extending laterally from the lower end of a bell crank 353 which is pivoted on a frame pin 354. The stud 352 also forms a pivotal connection between the bell crank 353 and a latch 360. A spring 355 extends between a pin 356, the bell crank 353 and a pin 357 on the latch to normally hold the parts in their positions shown in FIG. 4. In this position of the latch, an edge 361 thereof underlies a frame pin 362 which also forms a pivotal support for an arm 363 having a pin and slot connection 364 with the aforementioned link 241 operable by the total bar 14.

Means are provided whereby depression of the multiply bar 20 or divide bar 22 is effective to rock the bell crank 353 clockwise to its position illustrated in FIG. 15 wherein it will thereafter be held by the latch 360 due to engaement of a latching shoulder 365 on the latter against the pin 362. The other side of the hook like extremity 221 of the key stem of the multiply bar 20 overlies a pin 366 (FIG. 15) carried on a bell crank 367 fulcrumed on a frame stud 359. A depending arm on the bell crank is pivotally connected at 358 to a link 368 connected to the pin 352 on the bell crank 353. Therefore, upon depression of the multiply bar 20, the link 368 will draw the bell crank 353 clockwise until latched by the latch 360, whereupon the roller 343 will be moved to and held in its position shown in FIG. 24 wherein it will be effective to hold the link 325 in its lowered position throughout the major portion of the ensuing machine cycle. Therefore, the link will pass below the roller 324 throughout its travel.

The divide bar 22 (FIG. 4) overlies a stud 370 carried on a lever 371 fulcrumed on a frame pin 372 and pivotally connected by means of a pin and slot connection 373 to forward end of the bell crank 367. Thus, depression of the divide bar 22 will be effective to render the link inoperative in the same manner as it is rendered by the multiply bar 20.

Means are provided for relasing the latch 360 during the latter part of a machine cycle, providing the depressed multiply or divide bar is released at this time. This release occurs while the link 325 is being advanced forwardly to its initial position shown in FIG. 22 but after the forward edge thereof has passed under the roller 324. For this purpose, a live tip 375 is pivoted on the latch 360 at 376. A spring 378 is tensioned between an ear 377 on the live tip and the stud 357 on the latch to normally hold the tip in its position shown in full lines in FIG. 4.

Whenever the bell crank 353 is moved to its latched position shown in full lines in FIG. 15 (broken lines FIG. 4), the lower portion of the live tip 375 is moved downward into the path of a pin 381 on the aforementioned rack drive link 112. During advancement of the link at the start of a cycle, the pin 381 deflects the live tip against the action of the spring 378 as indicated by the dot and dash lines 375a (FIG. 15). Thereafter, and toward the end of the cycle, the pin 381, in returning, will engage the forward edge of the live tip, thereby rocking the assembly including the latch 360 counterclockwise to release the same. However, at this time the link 325 will still be in its lower position due to the combined action of the spring 355 and the ear 344 (FIG. 22).

The aforementioned controls facilitate the performance of multiplication and division calculations by the machine at a maximum speed.

In performing multiplication calculations, and in order to fully utilize the novel features of the machine so as to reduce the overall time required to complete a calculation, the multiplicand is entered into the keyboard. Then, the multiply bar 20 and the "0" amount key may be simultaneously depressed and held depressed until the machine has cycled a number of times equal to the lowermost denominational digit of the multiplier. At that time or at any time after approximately 75° of the preceding cycle, the "0" key is released, permitting the newly set "0" pin 32 to ride along the side of the adjacent stop slide 133. During the latter half of the cycle and as the stop slides 133 reach their rearward home positions, the spring 80 is effective to advance the pin carriage to its next position to the left.

Thereafter, the "0" key is again depressed enabling the pin carriage to move a small fraction of its next step to the left but not sufficient to effect a change in the control of the rack stop slides and racks.

Throughout the multiplication performance, the multiply bar may be held depressed so that the machine will continue to cycle uninterruptedly.

In performing division, the dividend is entered into the accumulator in a usual adding operation as described hereinafter. Thereafter, the division is entered in the pin carriage through the keyboard and the divide bar 22 is depressed and held depressed. As the machine cycles and when a negative overdraft occurs, the machine will be arrested by automatic releasing of the hook 199 (FIG. 3) in the clutch control linkage. Since the divide key has been held depressed, the repeat latch 360 will be returned to its latched position shown in FIG. 15 after its final release by the stud 381 on rack drive link 112 (FIG. 3). Now, the add bar 12 is depressed to add the divisor back once into the accumulator to correct the negative overdrafted condition. During this add-back cycle, a positive overdraft occurs to again arrest the machine even though the add bar may be held depressed. Since the latch 360 is effective (through the roller 343) during this cycle to hold the carriage return link 325 in its position shown in FIG. 24 so as to by pass the roller 324 thereby preventing the pin carriage from being returned to home position, the pin carriage will still retain the divisor therein at the conclusion of the cycle. This is true even though the latch 360 is released by the stud 381 at about 300° of the machine cycle when nearing the end of such add-back cycle. The net number of subtract cycles taken during this procedure thus indicates the value of the highermost denominational quotient digit. Thereafter, the back space key 18 is depressed to stop the carriage, i.e. the divisor, one denominational space to the right relative to the dividend registered in the accumulator so that the foregoing operation can be repeated to obtain the next lower denominational quotient digit.

*Retaining a constant*

A further feature of the aforementioned controls is the provision for retaining an amount in the pin carriage as a constant throughout any desired number of calculations. This is made possible by the particular provision of the latch 360 associated with the rack stop slide controls. Consider as an example, a series of multiplication problems wherein one factor remains the same throughout such series; namely $1.25 by 32 and by 42 etc. In this case, the $1.25 is entered into the pin carriage and the multiplication operation performed in the aforementioned manner. By depressing the total bar 14, the machine cycles to total out and print the product of this multiplication.

Since the rack stop slides 133 are retained in a lowered position during such totaling (or subtotaling) operations, they will be arrested only by the accumulator gear as they return to zero registration and will be uneffected by the set stop pins 32 of the pin carriage.

Normally, a foot 369 (FIG. 15) on the arm 363 is actuated by the link 241 upon depression of the total bar 14 to release the latch 360 which was originally latched as an incident to depression of the multiply bar 20. However, if the multiply bar 20 be depressed shortly after depression of the total bar 14, and before the pin carriage return link 325 has moved forwardly from its rearward position shown in FIG. 23, the latch 360 will again be actuated, lowering the roller 343 to lower the link 325 so that it will be ineffective to return the pin carriage. Accordingly, the constant ($1.25) will be retained in the pin carriage and may be used in the subsequent multiplication calculation.

*Clear key controls*

The clear bar 17 (FIGS. 1, 5, and 25) is slidably mounted in aligned slots in the key top plate 23 and the keyboard frame 24, the stem having a shoulder overlying a pin 382 on a lever 383. The latter is fulcrummed on a frame pin 384 and at its forward end overlies a pin 385 carried on a camming bail 386. The bail is pivoted on the aforementioned cross rod 188 and is provided with a camming hook 387 which is effective to engage a stud 388 of the accumulator conditioning control bar 174 (see also FIG. 5). The hook 387 is so formed that it will be effective, upon depression of the bar 17, to move the bar 174, and consequently the hook member 161, to their neutral or non add positions. The bail 386 also has a shoulder 386a engageable with the pin 233 attached to the clutch control bar 205 (FIGS. 3 and 25). Therefor, with these parts and certain other parts hereinafter described the clear bar is effective to clear the keyboard for a new amount entry and to neutralize the accumulator to cause a non add operation, means being provided under control of this bar to prevent operation of the printing mechanism during the ensuing cycle.

For this purpose certain parts are associated with a symbol rack 400 (FIG. 25) meshed with a gear train embodying an idler gear 401 similar to and mounted upon the same shaft as the gears 130. The former gear is employed for setting a symbol printing dial (not shown) in the same manner that the latter gears set the printing dials 125 (FIG. 2). When an erroneous amount is to be cleared from the keyboard the clear key 17 is depressed thereby initiating a new machine cycle by means of the clutch bar 205 and the shaft 116 will carry the symbol rack 400 forward upon the shaft 111 and a frame pin 402. When the symbol rack reaches the desired forward position for clearing, the rear end of a slot 403 will engage the pin 402 thereby stopping the rack but the shaft 116 will continue on to its limit because the latter shaft will break the grip of and depress a scissor bar 404 pivoted at 405 upon the rack and urged upwardly by a spring 406. Prior to the forward movement of the rack the link 304 (FIG. 28) will have moved rearwardly, opening the lock bail 310 and releasing a gear lock bail 407 which pivots forwardly about a rod 408 under the power of a spring 409 connecting the bail and the keyboard frame (FIG. 13). The bail 407 is released because a latch 410 removes the pressure against a rod 411 carried by the bail, as the latch pivots counterclockwise about the frame pin 302 under the impulse of the link 304 and its slot connection with the pin 303. The bail 407 has a tooth 412 common to all the idler gears 130 and the gear 401. The rod 411 is also effective to rock a latch 413 counterclockwise about a pivot rod 414 as the link 304 moves rearwardly. The latch 413 is provided with a struck out tongue 415 positioned to register with different portions of an irregular slot 416 provided in the gear 401. A locking arm 417 is keyed on the shaft 136. Observe that the arm 417 does not have the free movement upon the shaft 136 as is true of the printer arms 135. After the symbol rack 400 has reached its most forward position the link 304 will move rearwardly as hereinbefore described thereby rocking the latch 413 clockwise until the tongue 415 rests within a notch 418 of the slot 416 and with the latch overhanging the arm 417 as in FIG. 25 thereby preventing the shaft 136 from rotating clockwise at the usual printing time and the arms 135 will hence be prevented from striking the printing dials 125 against the ribbon 142. As the gear 401 rotates clockwise toward the non-print position, the end of a slot 421 in the gear will engage a pin 422 on a bail 423 pivoted upon the shaft 131 and a pin 424 on the bail will move into the path of a lug 425 on a cam follower 426 thereby preventing the follower roller 427 from dropping into the low peripheral surface of a cam 428 and likewise preventing the movement of a ribbon and paper feeding mechanism (not shown) but connected to a link 429. The machine movement following this and hereinbefore described will cause the arm 322 to return the pin carriage and thereby clear the latter and cancel the erroneous entry. Should control keys other than the clear key be depressed, appropriate stops (not shown) will stop the symbol rack so that the gear 401 will be stopped with the tongue 415 resting against some point on the high portion 419 of the slot 416 between a low portion 420 and the notch 418 thereby preventing the latch from overhanging the arm 417, and the shaft 136 will be free to move the printer arms 135.

Although we have described our invention in detail and have therefore used certain terms and languages herein, it is to be understood that the present disclosure is illustrative rather than restrictive, particularly in regard to the make and type of machine to which it is applied, and that changes and modifications may be made without departing from the spirit or scope of the invention as set forth in the claims appended hereto.

Having thus described the invention, what we desire to secure by United States Letters Patent is:

1. In a calculating machine having differentially movable actuators, drive means for said actuators, a plurality of amount keys, a pin carriage settable by said keys, and means responsive to depression of any of said keys for stepping said pin carriage laterally into different positions relative to said actuators, a pin carriage return mechanism comprising the combination of first element operatively connected to said carriage, a reciprocable actuator element movable through a first path werein it is effective to engage said element to return said pin carriage said actuator element being movable through a second path wherein it is ineffective to engage said element, a spring effective only when said actuator element is in an advanced position for locating said actuator element in said second path, and a second spring effective only when said actuator element is in a retracted position for locating said actuator element in first path.

2. A pin carriage return mechanism according to claim 1 comprising guide means for maintaining said actuator element in one or another of said paths during traverse thereof between advanced and retracted positions.

3. In a calculating machine having differentially movable actuators, drive means for said actuators, a plurality of amount keys, a pin carriage settable by said keys, and means responsive to depression of said keys for stepping said pin carriage laterally into different positions relative to said actuators, a pin carriage return mechanism comprising the combination of a first element operatively connected to said carriage, a reciprocable actuator element movable through a first path wherein it is effective to engage said element to return said pin carriage, said actuator being movable through a second path wherein it is ineffective to engage said element, means for normally causing said actuator to advance through said first path and to retract to said second path, guide means for maintaining said actuator in one or another of said paths during traverse thereof between advanced and retracted positions, a repeat control mechanism including a depressible key; a latch operable in response to said repeat control mechanism for maintaining said actuator in said second path, and means operable by said drive means for releasing said latch only after said actuator has at least partially moved to its advanced position.

4. A calculating machine comprising an accumulator, reciprocable actuators therefor, a pin carriage including settable pins for differentially limiting the extent of movement of said actuators, a zero stop ledge extending to the left of said pins, a zero stop element extending between said zero stop ledge and said pins, and means yieldably maintaining said zero stop element in a position to restrict movement of an aligned one of said actuators; means for setting said pins, means responsive to said pin setting means for stepping said carriage to the left from a home position into different positions relative to said actuators, drive means for said actuators, means controlled by said drive means for returning said carriage toward said home position, said means being effective to overthrow said carriage beyond said home position, and a stationary cam plate effective to cam set ones of said pins from set position during said overthrow movement, said cam plate being effective to cam said zero stop element against the action of said yieldable means during said overthrow movement.

5. A calculating machine comprising an accumulator, reciprocable actuators therefor, a pin carriage including settable pins for differentially limiting the extent of movement of said actuators, a zero stop ledge extending to the left of said pins, an additional zero stop pin intermediate said zero stop ledge and said settable pins, and a spring normally biasing said zero stop pin into a position to restrict movement of an aligned one of said actuators; means for setting said pins, means responsive to said pin setting means for stepping said carriage to the left from a home position into different positions relative to said actuators, drive means for said actuators, means controlled by said drive means for returning said carriage toward said home position, said means being effective to overthrow said carriage beyond said home position, and a deflector effective to deflect set ones of said pins from set position during said overthrow movement, said deflector being effective to deflect said zero stop pin against the action of said spring during said overthrow movement.

6. In a calculating machine having a frame, an accumulator, reciprocable actuators therefor, drive means for said actuators, a pin carriage including settable pins for differentially limiting the extent of said movement of said actuators; means including a shaft supporting said carriage for lateral movement; means including depressible amount keys for setting said pins; means controlled by said setting means for stepping said carriage along said shaft into different positions relative to said actuators, control means for causing operation of said drive means, cam means on said shaft cooperable with said frame, means normally positioning said shaft to provide spaces between zero representing ones of said pins and said actuators, and means controlled by said drive means for rotating said shaft to cause said cam means to advance said shaft whereby to close said spaces.

7. A calculating machine comprising an accumulator, reciprocable actuators therefor, said actuators being movable in two directions, drive means for said actuators, a pin carriage including settable pins for differentially limiting the extent of movement of said actuators, means including depressible amount keys for setting said pins; means including a shaft supporting said carriage for lateral movement, means controlled by said setting means for stepping said carriage along said shaft into different positions relative to said actuators, control mechanism for causing operation of said drive means, guide means supporting said shaft for rotary movement and for bodily movement toward and away from said pins, cam means on said shaft cooperable with said guide means, and means controlled by said drive means for rotating said shaft and said cam means for a position spacing zero representing ones of said pins from said actuators to a position closing said spaces.

References Cited in the file of this patent

UNITED STATES PATENTS

| | | |
|---|---|---|
| 1,524,365 | Myers et al. | Jan. 27, 1925 |
| 2,034,345 | Kottmann | Mar. 17, 1936 |
| 2,303,692 | Hellgren | Dec. 1, 1942 |
| 2,515,692 | Boyden et al. | July 18, 1950 |
| 2,675,960 | Frieberg et al. | Apr. 20, 1954 |
| 2,678,162 | Hutton | May 11, 1954 |
| 2,708,550 | Maier | May 17, 1955 |
| 2,833,467 | Christoff et al. | May 6, 1958 |

FOREIGN PATENTS

| | | |
|---|---|---|
| 118,240 | Sweden | Jan. 2, 1947 |